(12) United States Patent
Lu

(10) Patent No.: US 11,616,909 B2
(45) Date of Patent: Mar. 28, 2023

(54) METHOD OF COMPENSATING FOR COLOR DIFFERENCES BETWEEN ADJACENT LENS IMAGES IN A PANORAMIC IMAGE

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 0 days.

(21) Appl. No.: 17/115,215

(22) Filed: Dec. 8, 2020

(65) Prior Publication Data

US 2022/0182541 A1    Jun. 9, 2022

(51) Int. Cl.
*H04N 5/232* (2006.01)
*G03B 37/04* (2021.01)
*G06T 3/40* (2006.01)

(52) U.S. Cl.
CPC ......... *H04N 5/23238* (2013.01); *G03B 37/04* (2013.01); *G06T 3/4038* (2013.01)

(58) Field of Classification Search
CPC ... H04N 5/23238; G03B 37/04; G06T 3/4038
See application file for complete search history.

(56) References Cited

U.S. PATENT DOCUMENTS

| 10,810,700 | B2 | 10/2020 | Lu | |
| 2018/0357804 | A1 | 12/2018 | Forutanpour et al. | |
| 2020/0074716 | A1 | 3/2020 | Kaplan | |
| 2020/0202581 | A1* | 6/2020 | Kawaguchi | G06T 7/90 |
| 2020/0302575 | A1* | 9/2020 | Lee | G06T 3/4038 |

FOREIGN PATENT DOCUMENTS

| CN | 107360418 A | 11/2017 |
| CN | 109493273 A | 3/2019 |

* cited by examiner

*Primary Examiner* — Joseph W Becker
(74) *Attorney, Agent, or Firm* — Muncy, Geissler, Olds & Lowe, P.C.

(57) ABSTRACT

A method of compensating for color differences between adjacent lens images in a panoramic image is disclosed. The method comprises: calculating color differences of each pair of character regions between any two adjacent lens images out of multiple lens images from a multiple-lens camera according to average color values of the character regions, each character region having a character point; determining color adjustment amounts of character points in each lens image according to the color differences of each pair of character regions; calculating a color adjustment amount of an element according to positions of the element and its two adjacent character points and the color adjustment amounts of the two adjacent character points.

15 Claims, 20 Drawing Sheets polygon mesh on equirectangle domain

Triangle mesh modeling a sphere

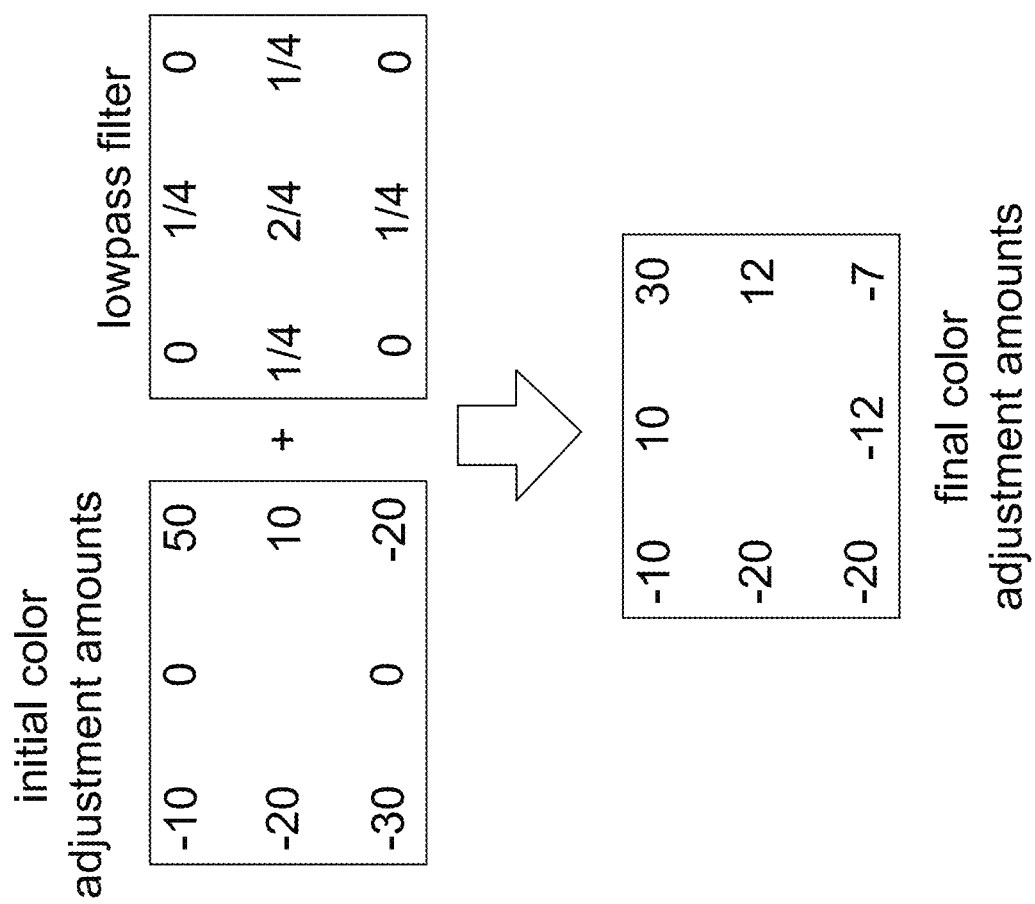

METHOD OF COMPENSATING FOR COLOR DIFFERENCES BETWEEN ADJACENT LENS IMAGES IN A PANORAMIC IMAGE

BACKGROUND OF THE INVENTION

Field of the Invention

The invention relates to panoramic imaging, and more particularly, to a method of compensating for color differences between adjacent lens images in a panoramic image.

Description of the Related Art

A multiple-lens camera captures a view with a 360-degree horizontal field of view (FOV) and up to a 180-degree vertical FOV. For example, as shown in FIG. 1A, a conventional multiple-lens camera includes four lens respectively mounted on four faces (right, left, front, back) of a cube framework 11. Any two adjacent faces of the four faces are substantially orthogonal, such as facing toward 0°, 90°, 180°, 270° of longitude of the virtual sphere 12, respectively, to simultaneously capture a view with a 360-degree horizontal FOV and a 90-degree vertical FOV to generate four lens images. A requirement for the four lens is that there should be sufficient overlaps between the views of two adjacent lenses, so as to facilitate image mosaicking. Referring to FIG. 1B, pixels in regions 13 are overlapping by two lens/texture images while pixels in regions 15 comes from a single lens/texture image. Stitching operations over the overlapping regions 13 are performed to form a panoramic image.

In a likely scenario, if one lens of the four-lens camera directly faces toward a light source (such as the sun) and another lens faces toward a dark place, there would be a big difference in color representations of the images generated by the aforementioned lenses, including the overlapping regions 13, even with the same exposure time. It is hereinafter called "color difference phenomenon." Accordingly, what is needed is a compensation method to improve image quality under the color difference phenomenon.

SUMMARY OF THE INVENTION

In view of the above-mentioned problems, an object of the invention is to provide a compensation method to improve image quality under the color difference phenomenon.

One embodiment of the invention provides a method of compensating for color differences between adjacent lens images in a panoramic image. The method comprises: calculating color differences of each pair of character regions between any two adjacent lens images out of multiple lens images from a multiple-lens camera according to average color values of the character regions, each character region having a character point; determining color adjustment amounts of character points in each lens image according to the color differences of each pair of character regions; and calculating a color adjustment amount of an element according to positions of the element and its two adjacent character points and the color adjustment amounts of the two adjacent character points.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8C is an example showing eight initial color adjustment amounts of eight character regions in one texture image are filtered with a lowpass filter on the right side to obtain eight final color adjustment amounts at the bottom.

DETAILED DESCRIPTION OF THE INVENTION

Figure 1B:
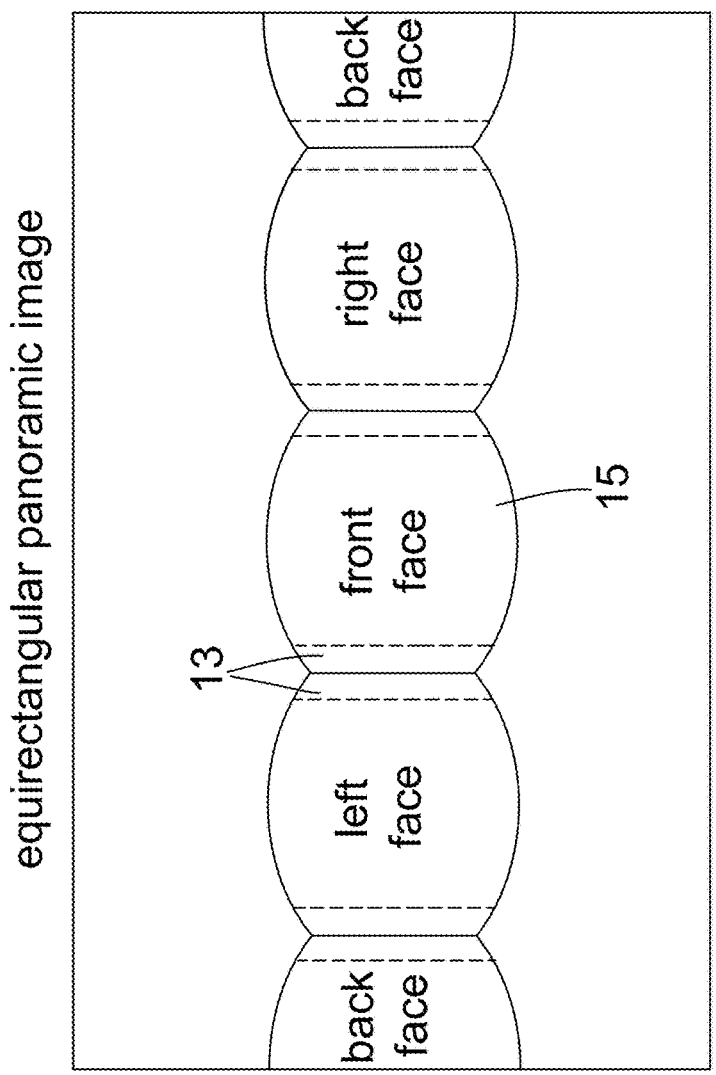
FIG. 1B shows an equirectangular panoramic image derived from an equirectangular projection of four-lens images (right, left, front, back).

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

Figure 2:
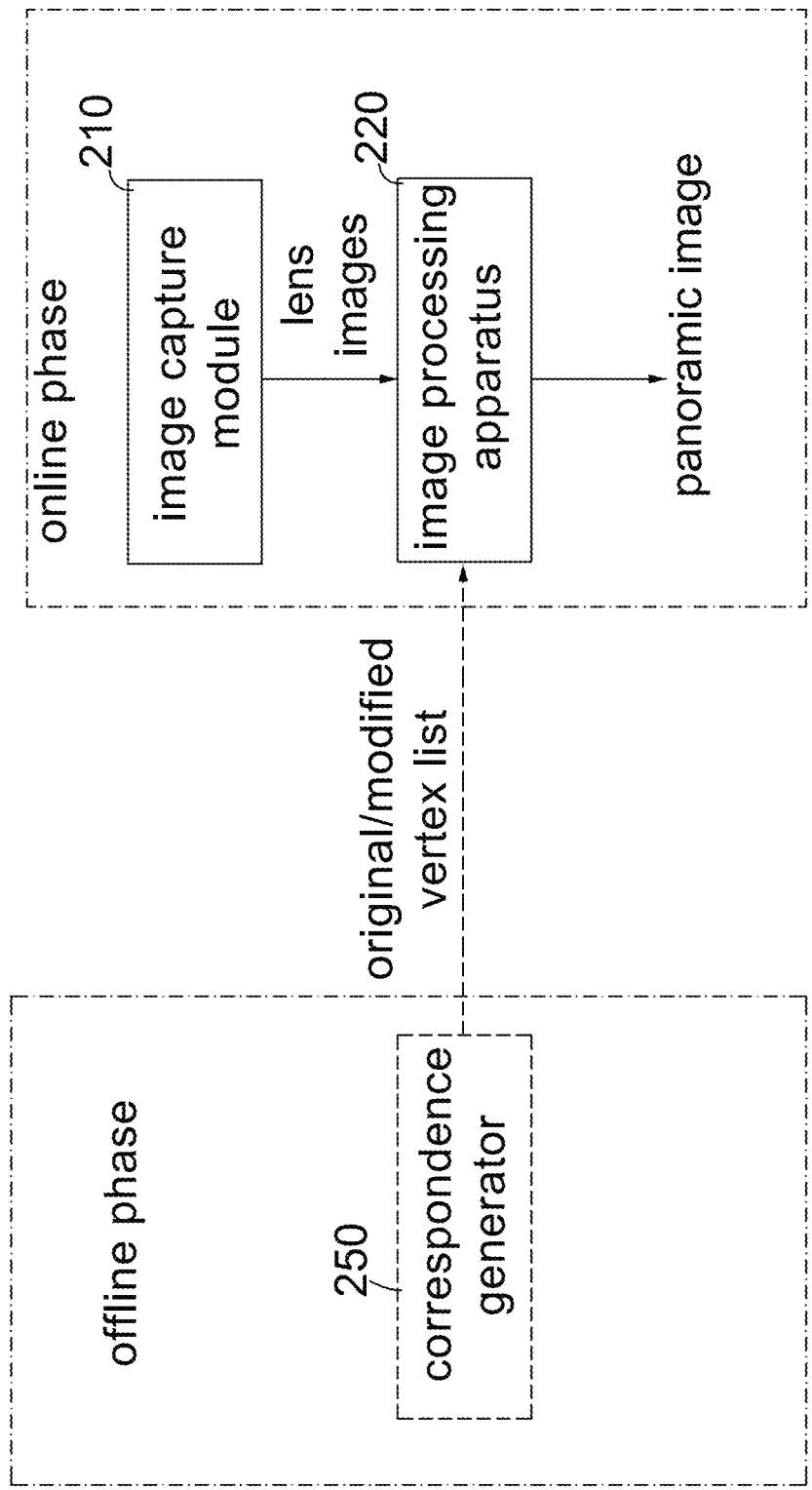
FIG. 2 is a diagram showing a panoramic image processing system according to an embodiment of the invention.

FIG. 2 is a block diagram showing a panoramic image processing system according to an embodiment of the invention. Referring to FIG. 2, the panoramic image processing system 200 includes an image capture module 210 and an image processing apparatus 220. A correspondence generator 250 is optional.

The image capture module 210 is a multiple-lens camera, which is capable of capturing a view with up to 360-degree horizontal FOV and 180-degree vertical FOV to generate a plurality of lens images. After receiving the lens images from the image capture module 210, the image processing apparatus 220 produces a 2D color adjustment array with color adjustment amounts for each lens image, and then performs stitching operations according to the lens images and the 2D color adjustment array to form a panoramic image. Please note that the number of the lenses is not limited as long as it is sufficient for the lenses to capture a FOV up to 360-degree horizontally and 180-degree vertically altogether. A requirement is that there should be sufficient overlaps between the views of any two adjacent lenses to facilitate image mosaicking. Examples of the panoramic image include, without limitation, a 360-degree panoramic image and an equirectangular panoramic image.

For purposes of clarity and ease of description, hereinafter, the following examples and embodiments will be described with the equirectangular panoramic image and with the assumption that the image capture module 210 includes four lenses respectively mounted on the four faces (right, left, front, back) of the cube framework 11.

Figure 3A:
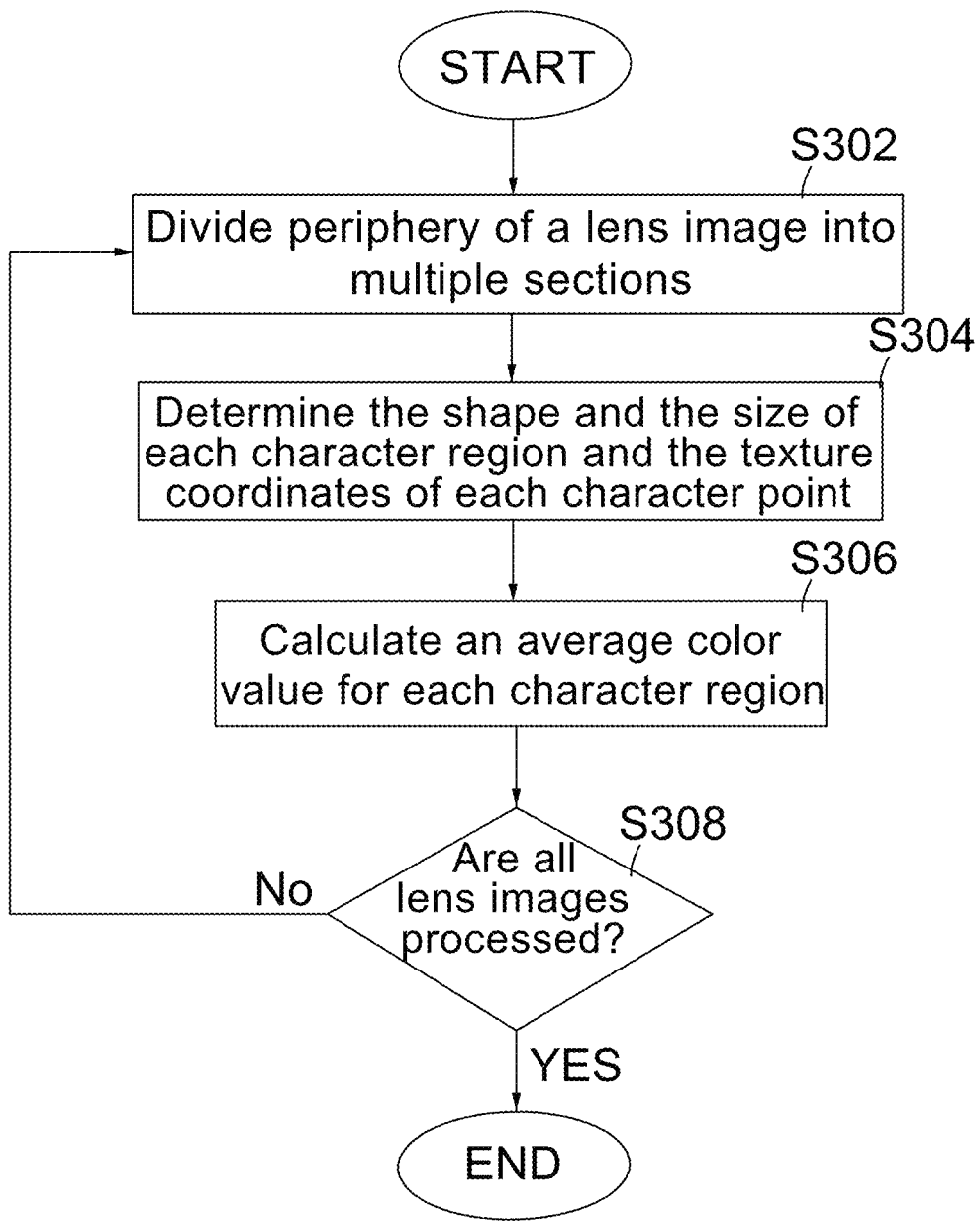
FIG. 3A is a flow chart showing a method of averaging the color values of all pixels in each character region according to a first embodiment of the invention.

FIG. 3A is a flow chart showing a method of averaging the color values of all pixels in each character region (performed by the image processing apparatus 220) according to a first embodiment of the invention. The method of averaging the color values of all pixels in each character region is described below.

Figure 3B:
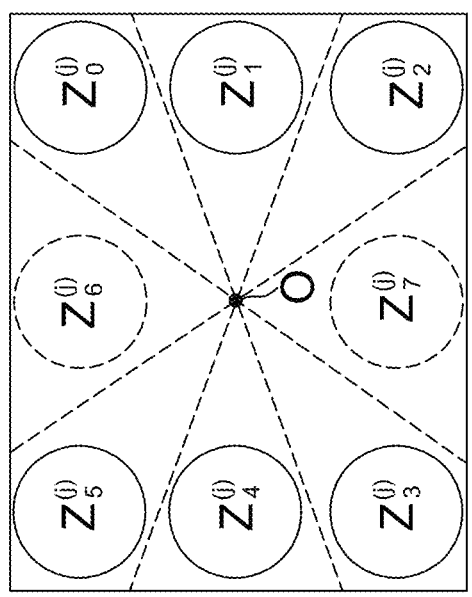
FIG. 3B is an example that each edge of a texture/lens image is divided relative to the image center O into three character regions.

Step S302: Divide the periphery of a texture/lens image j into multiple sections. FIG. 3B is an example that a texture/lens image is divided into eight sections, while each section includes one character region $Z_i^{(j)}$, where j denotes an index/ID of the texture/lens image and i denotes an index/ID of character region in the lens image j, for i=0~7.

Step S304: Determine the shape and the size of each character region and the texture coordinates of the character point in each character region. In FIG. 3B, the shapes (i.e., circles) of the character regions $Z_i^{(j)}$ are provided as merely an example but not limitations of the invention. A character point $CP_i^{(j)}$ with its texture coordinates is assigned to a character region $Z_i^{(j)}$. Each character region $Z_i^{(j)}$ is within and corresponds to one section. The character point $CP_i^{(j)}$ may be a gravity center or a centroid of the character region $Z_i^{(j)}$. The shapes/radiuses/sizes of the character regions in the texture image j may be arbitrarily selected as long as any two adjacent character regions do not overlap; however, a slight overlap is operable. Here, the term "texture coordinates" refers to coordinates in a texture space (such as a lens/texture image j).

Step S306: Calculate an average color value $AC_i^{(j)}$ (including Y, U and V components) of pixels in each character region $Z_i^{(j)}$ of the texture image j. It is noted that it is not necessary for a character region $Z_i^{(j)}$ to calculate its average color value if its character region is not located within any overlapping regions 13 in FIG. 1B. For example, referring to FIGS. 1B and 3B, there is no need for $AC_6^{(j)}$ and $AC_7^{(j)}$ to calculate their average color values.

Step S308: Determine whether all texture/lens images are all processed. If NO, go to step S302 for the following texture image; otherwise, the flow is terminated.

FIG. 2 also shows the processing pipeline of the panoramic image processing system 200 with the correspondence generator 250. The processing pipeline is divided into an offline phase and an online phase. In the online phase, the panoramic image processing system 200 displays panoramic images. In the offline phase, the correspondence generator 250 calibrates the four lenses separately. For example, the sphere 12 with 2-meter radius (r=2) in FIG. 1A is drawn in many circles as latitude and longitude (not shown), whose intersection points are treated as calibration points. The four lenses of the image capture module 210 capture these calibration points, and their positions on lens images are known. Then the mapping relationship between the equirectangular panoramic image and lens images are constructed since the view angles of the calibration points and texture coordinates are linked. A calibration point with the mapping relationship is defined as a "vertex" in this invention. After calibration, the correspondence generator 250 generates a correspondence table having multiple vertices, where each vertex provides the mapping between its equirectangular coordinates (longitude, latitude) and its texture coordinates in all lens images. In an alternative embodiment, according to the correspondence table, the correspondence generator 250 adopts appropriate image registration techniques to generate an original vertex list (Table 1), and each vertex in the original vertex list provides the vertex mapping between the equirectangular panoramic image and the lens images (or between the equirectangular coordinates and the texture coordinates) The correspondence generator 250 completes all necessary pre-computations in the offline phase.

Figure 4B:
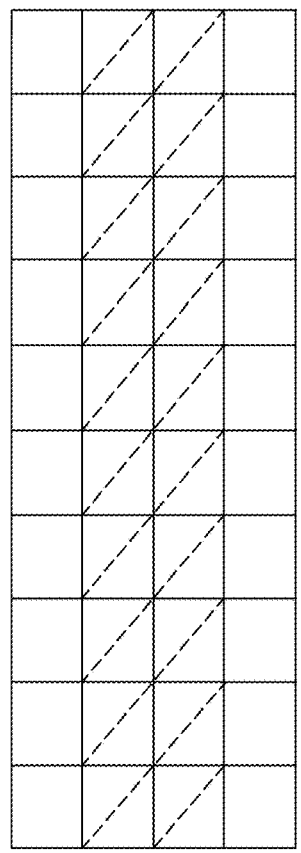
FIG. 4B shows a polygon mesh composing/modeling the equirectangular panoramic image.
Figure 4A:
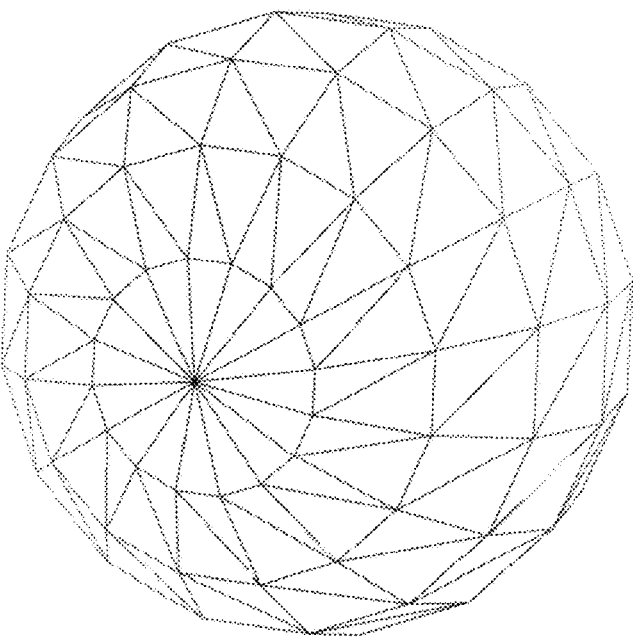
FIG. 4A shows a triangle mesh modeling a sphere surface.

FIG. 4A shows a triangle mesh modeling a sphere surface. The surface of the sphere 12 is modeled by using a triangle mesh as shown in FIG. 4A. FIG. 4B shows a polygon mesh composing/modeling the equirectangular panoramic image. The polygon mesh of FIG. 4B is produced by performing an equirectangular projection of the triangle mesh of FIG. 4A. The polygon mesh in FIG. 4B is a collection of quadrilaterals/triangles. Please note that only the top row and the bottom row of the polygon mesh in FIG. 4B are formed by quadrilaterals because they are projected from the pole triangles of the triangle mesh in FIG. 4A. The term "pole triangle" refers to a triangle with a vertex being a pole point (Zenith, Nadir) in a triangle mesh modeling a sphere surface.

According to the geometry of the equirectangular panoramic image and lens images, the correspondence generator 250 in offline phase computes equirectangular coordinates and the texture coordinates for each vertex in the polygon mesh (e.g., FIG. 4B) and determines whether the vertex is a pole point to generate the original vertex list. Finally, the correspondence generator 250 supplies the original vertex list to the image processing apparatus 220. Once the original vertex list is generated, it is repeated used by the image processing apparatus 220 for subsequent operations, e.g., stitching subsequent lens images. The original vertex list is a list of a plurality of vertices forming a plurality of quadrilaterals of the polygon mesh and each vertex is defined by its corresponding data structure. The data structure defines a vertex mapping between a destination space and a texture space (or between the equirectangular coordinates and the texture coordinates). In one embodiment, the data structure includes, without limitation, equirectangular coordinates, a pole flag, the number of covering/overlapping lens images, the texture coordinates in each lens image, ID for each lens image and a stitching blending weight for each lens image.

Table 1 shows an exemplary data structure for each vertex in the original vertex list.

TABLE 1

| Attributes | Descriptions |
|---|---|
| (x, y) | Equirectangular coordinates |
| Pole flag | Indicate whether the vertex is a pole point (e.g., 1: pole point; 0: not pole point) |
| N | Number of covering/overlapping lens images |
| $ID_1$ | ID of first lens image |
| $(u_1, v_1)$ | Texture coordinates in first lens image |
| $w_1$ | Stitching blending weight in first lens image |
| ... | ... |
| $ID_N$ | ID of $N^{th}$ lens image |
| $(u_N, v_N)$ | Texture coordinates in $N^{th}$ lens image |
| $w_N$ | Stitching blending weight in $N^{th}$ lens image |

Figure 5A:
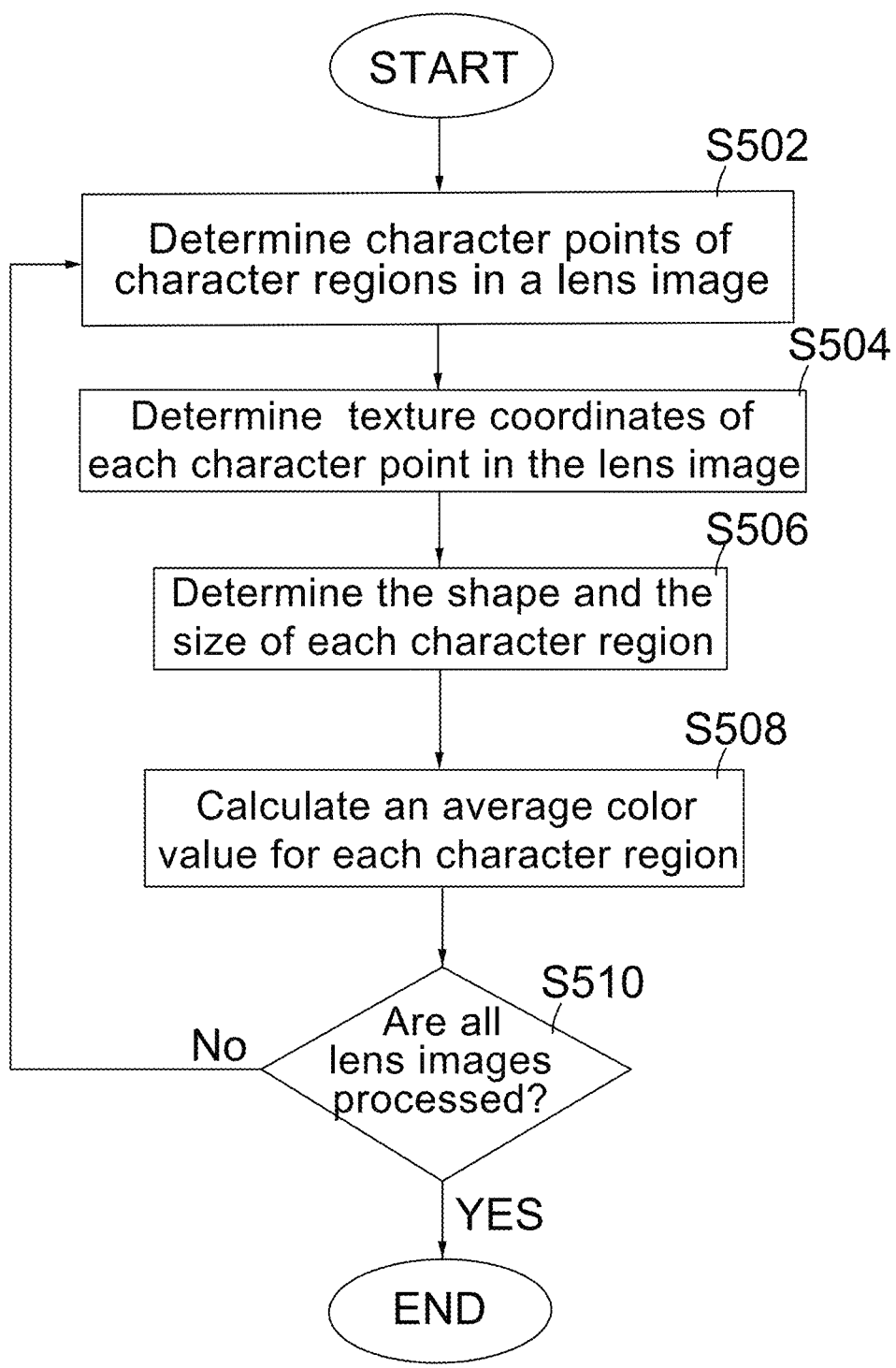
FIG. 5A is a flow chart showing a method of averaging the color values of all pixels in each character region according to a second embodiment of the invention.

FIG. 5A is a flow chart showing a method of averaging the color values of all pixels in each character region (performed by the image processing apparatus 220) according to a second embodiment of the invention. According to the second embodiment, the method of averaging the color values of all pixels in each character region is described below.

Figure 5B:
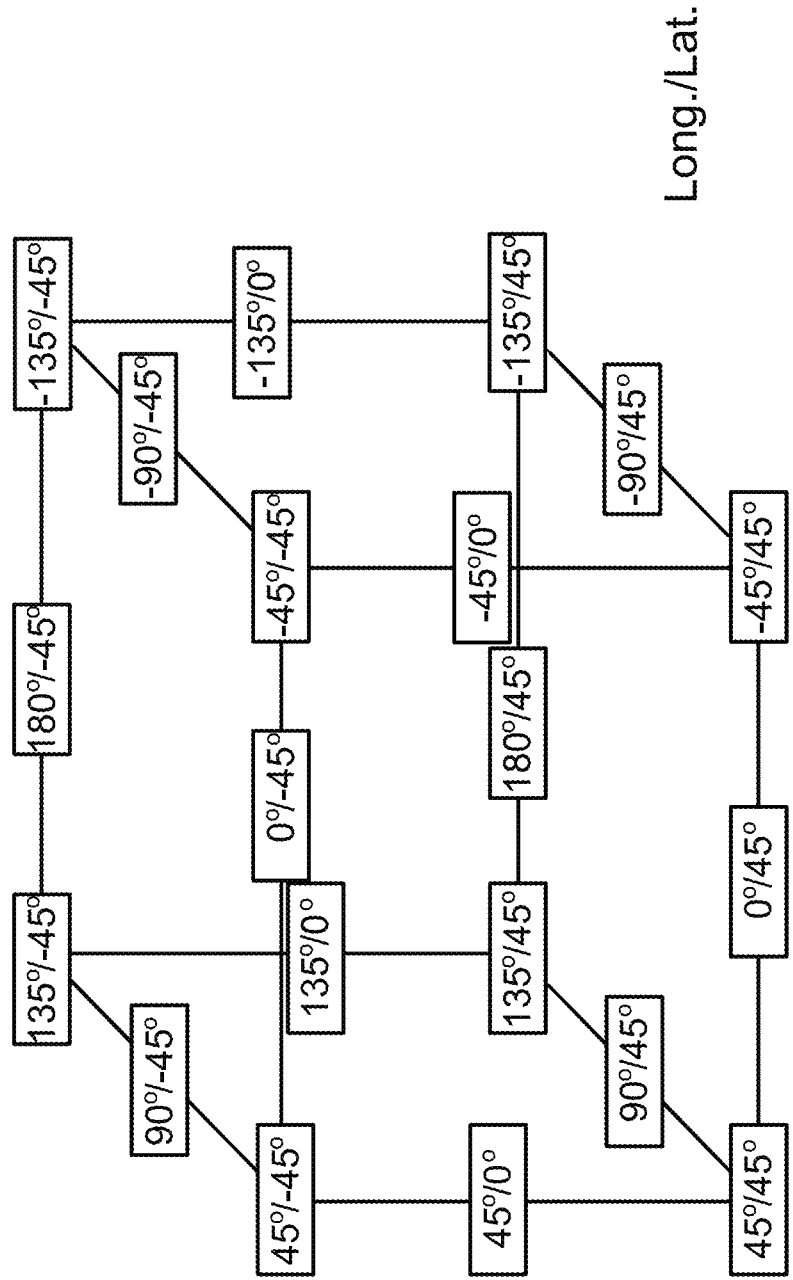
FIG. 5B shows an example of predefined values of longitude and latitude coordinates for eight centroids of eight character regions in each of four texture/lens images (right, left, front, back).

Step S502: Determine character points of character regions in a texture/lens image j and their longitude and latitude coordinates (i.e., equirectangular coordinates). Please refer to FIG. 1A and FIG. 5B together. FIG. 5B shows the cube framework 11 in FIG. 1A having all chosen character points bearing their longitude and latitude coordinates (i.e., equirectangular coordinates). Please note that all character points must be located in overlapping regions (e.g., R(1)~R(12) in FIG. 6B) of the texture/lens images. In this embodiment, there are eight character points $CP_i^{(j)}$ for each of four texture/lens images, i.e., i=0~7 and j=0~3. However, the longitude and latitude coordinates shown in FIG. 5B are provided merely as an example but not limitations of the invention. In actual implementations, any other points can be chosen as the character points as long as the points are respectively located in the overlapping regions 13.

Step S504: Determine texture coordinates of each character point $CP_i^{(j)}$ in the texture/lens image according to the correspondence table (or the original vertex list) and its longitude and latitude coordinates (i.e., equirectangular coordinates). As set forth above, the data structure of each vertex in the original vertex list provides a vertex mapping between the equirectangular coordinates and the texture coordinates; in addition, the correspondence table provides the mapping between the equirectangular coordinates and the texture coordinates for each vertex. For example, the original vertex list from the correspondence generator 250 is searched for a vertex with its equirectangular coordinates equal to 45° of longitude and 0° of latitude and soon a matched vertex would be found. Then, referring to Table 1, first texture coordinates $(u_1, v_1)$ in first texture image (e.g., front face) and second texture coordinates $(u_2, v_2)$ in second texture image (e.g., right face) are retrieved from the data structure of the matched vertex, because the centroid having 45° of longitude and 0° of latitude is definitely located in an overlapping region 13.

Step S506: Determine the shape and the size of each character region $Z_i^{(j)}$ relative to its character point, for i=0~5. As set forth above, any shapes and sizes are applicable to the character regions as long as any two adjacent character regions do not overlap. However, a slight overlap is operable. As set forth above, since the top and bottom edges of each texture/lens image do not overlap with any images and texture coordinates of each character point $CP_i^{(j)}$ are determined, there is no need to determine the shape and the size of the character regions $Z_6^{(j)}$ and $Z_7^{(j)}$ and calculate the average color value for the top and bottom control regions $Z_6^{(j)}$ and $Z_7^{(j)}$.

Step S508: Calculate an average color value $AC_i^{(j)}$ (including Y, U and V components) of all pixels in each character region $Z_i^{(j)}$ in the texture image j, for i=0~5.

Step S510: Determine whether all faces of texture/lens images are all processed. If NO, go to step S502 for the following texture image; otherwise, the flow is terminated.

In an alternative embodiment, the correspondence generator 250 provides a modified vertex list (Table 2) to the image processing apparatus 220. The modified vertex list is a list of a plurality of vertices forming a plurality of quadrilaterals of the polygon mesh (FIG. 4B) and each vertex is defined by its corresponding data structure. Table 2 shows an exemplary data structure of each vertex in the modified vertex list.

TABLE 2

| Attributes | Descriptions |
|---|---|
| (x, y) | Equirectangular coordinates |
| N | Number of covering/overlapping lens images |
| Pole flag | Indicate whether the vertex is a pole point (e.g., 1: pole point; 0: not pole point) |
| $ID_1$ | ID of first lens image |
| $(u_1, v_1)$ | Texture coordinates in first lens image |
| $w_1$ | Stitching blending weight in first lens image |
| $(idx_{10}, idx_{11})$ | Warping coefficient indices in first lens image |
| $Alpha_1$ | Blending weight for warping coefficients in first lens image |
| $IA_1$ | Index of color value accumulator for first lens image |
| $(ide_{10}, ide_{11})$ | Color adjustment indices in first lens image |
| $cw_1$ | Blending weight for color adjustment in first lens image |
| ... | ... |
| $ID_N$ | ID of $N^{th}$ lens image |
| $(u_N, v_N)$ | Texture coordinates in $N^{th}$ lens image |
| $w_N$ | Stitching blending weight in $N^{th}$ lens image |
| $(idx_{N0}, idx_{N1})$ | Warping coefficient indices in $N^{th}$ lens image |
| $Alpha_N$ | Blending weight for warping coefficients in $N^{th}$ lens image |
| $IA_N$ | Index of color value accumulator for $N^{th}$ lens image |
| $(ide_{N0}, ide_{N1})$ | Color adjustment indices in $N^{th}$ lens image |
| $cw_N$ | Blending weight for color adjustment in $N^{th}$ lens image |

The data structure of each vertex in the modified vertex list (Table 2) additionally includes five fields, i.e., warping coefficient indices $(idx_{k0}, idx_{k1})$, a blending weight for warping coefficients $(Alpha_k)$, an index of color value accumulator $(IA_k)$, color adjustment indices $(ide_{k0}, ide_{k1})$ and a blending weight for color adjustment $(cw_k)$ for each lens image in comparison with the data structure of each vertex in the original vertex list (Table 1), for k=1~N.

Figure 6A:
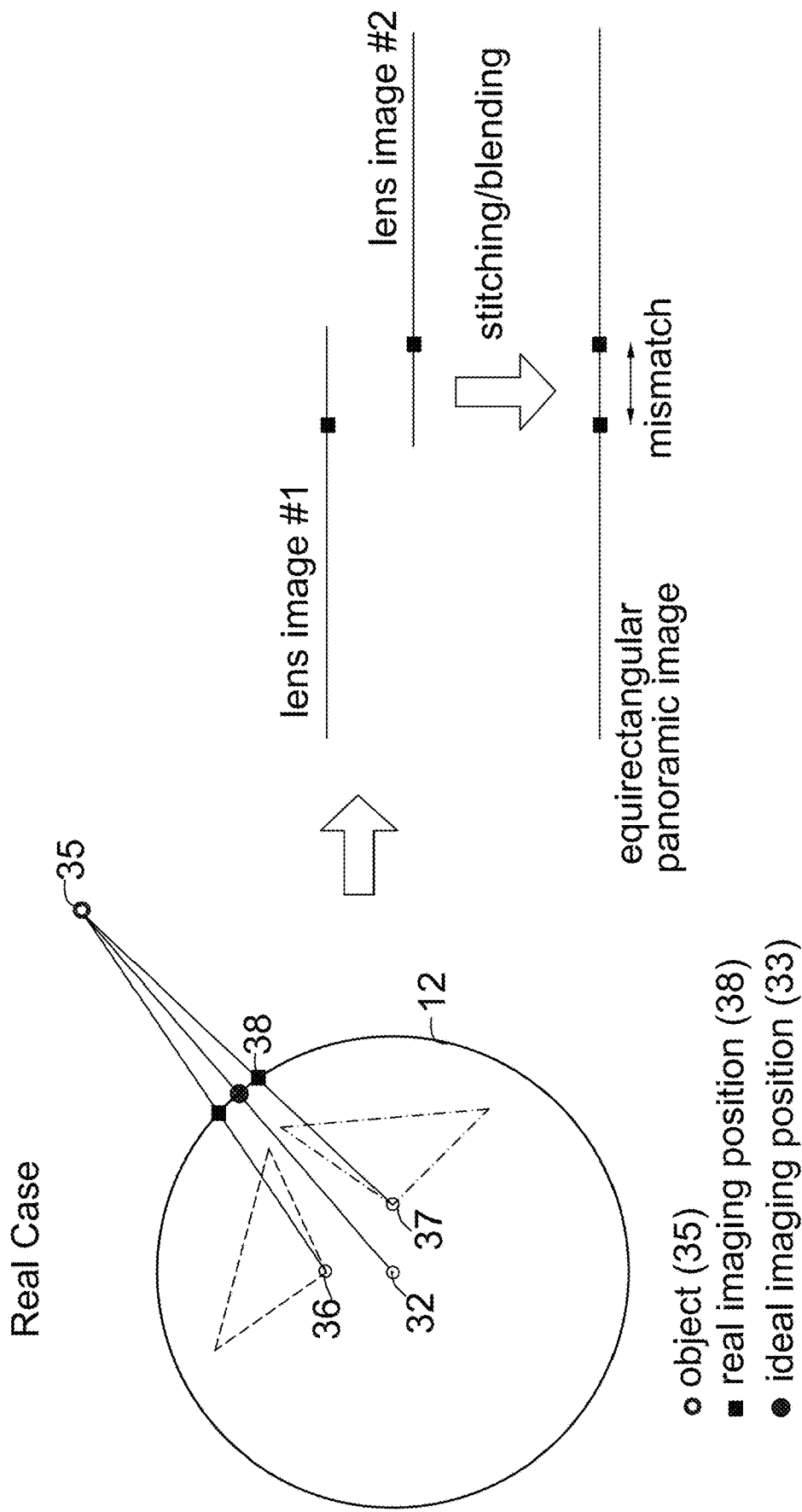
FIG. 6A shows a mis-match stitching result derived from shifted lens centers.

Please refer to FIGS. 1A and 6A together. In an ideal case, four lenses (including lens #1 and lens #2) of the image capture module 210 simultaneously located at the system center of the cube framework 11, so a single ideal imaging point derived from a far object is located on an image plane (sphere) 12 with a radius of 2 meters (r=2). Thus, since the ideal imaging position in the lens image #1 (from lens #1) matches the ideal image position in the lens image #2 (from lens #2), a perfect stitching/blending result would be shown in the equirectangular panoramic image after an image stitching/blending process is completed. However, in real cases, the real focal points (or lens centers) 36 and 37 for lens #1 and lens #2 are separated from the optimal focal point (or system center) 32, so that two real imaging positions 38 derived from a far object 35 are separately located on the image plane (sphere) 12 as shown in the left portion of FIG. 6A. Consequently, referring to the right portion of FIG. 6A, a mismatch image defect is clearly shown in the equirectangular panoramic image after an image stitching/blending process is completed. Thus, the texture coordinates for each vertex need to be modified to lessen the mismatch image defect caused by shifted lens centers of the image capture module 210.

Figure 6B:
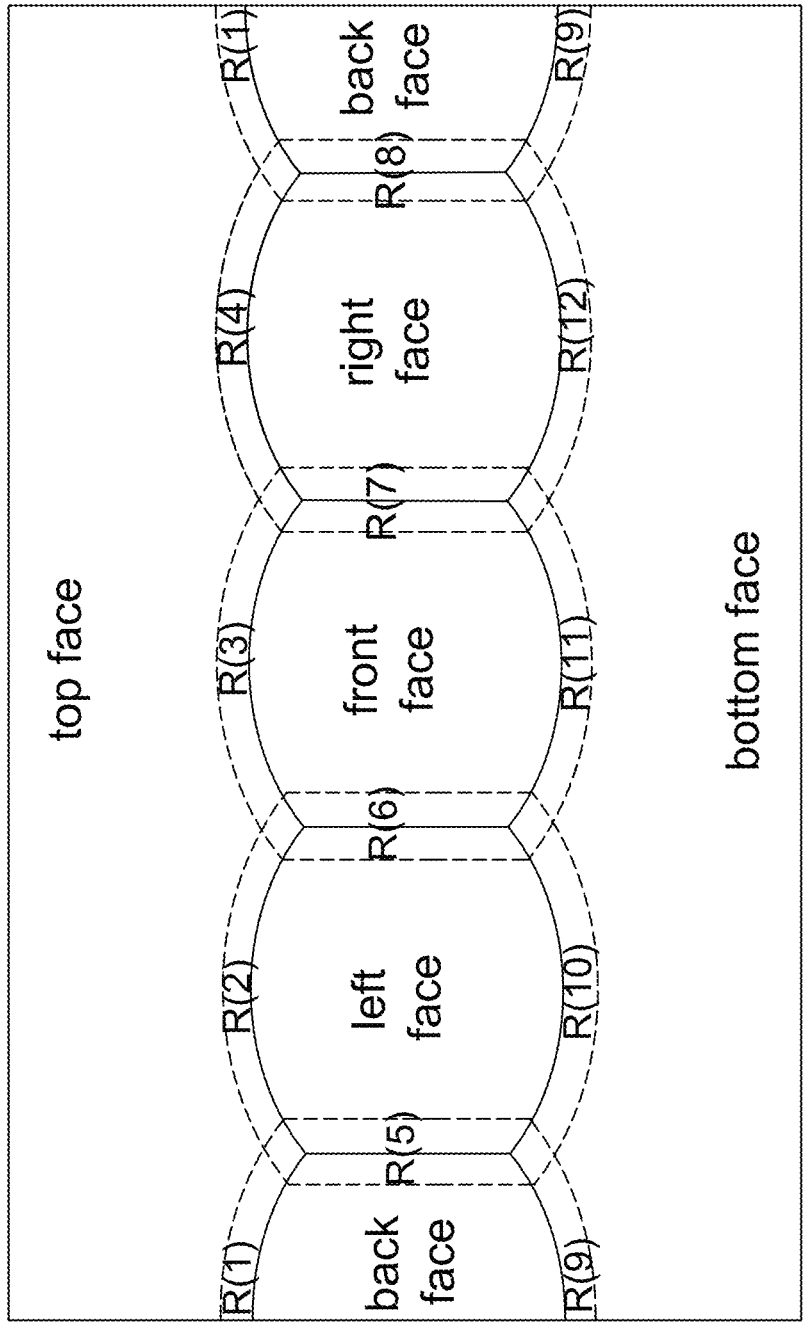
FIG. 6B shows an exemplary equirectangular panoramic image with twelve overlap regions according to the prior art.
Figure 6C:
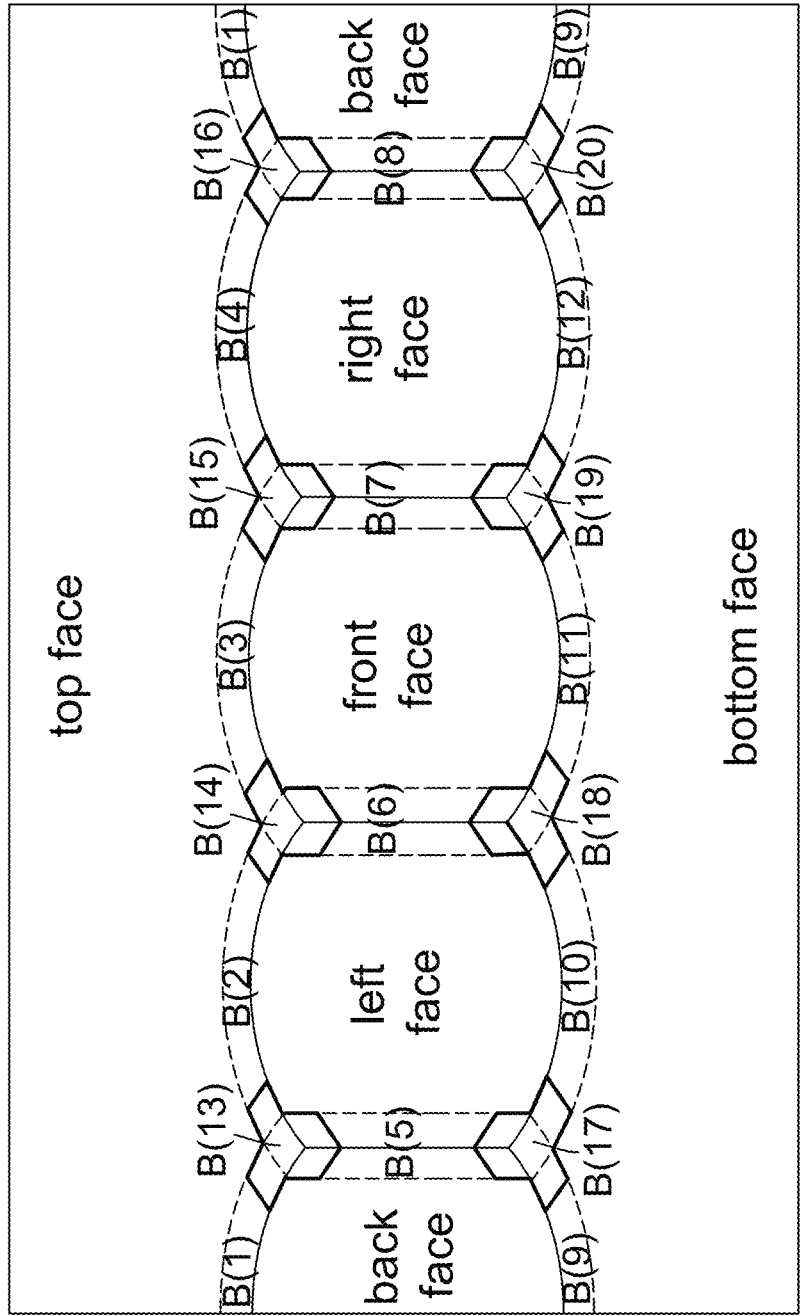
FIG. 6C shows an exemplary equirectangular panoramic image with twenty control regions.

FIG. 6B shows an exemplary equirectangular panoramic image with twelve overlap regions according to the prior art. FIG. 6C shows an exemplary equirectangular panoramic image with twenty control regions according to the prior art. Comparing FIGS. 6B-6C, the twelve overlap regions R(1)~R(12) are divided into twenty control regions B(1)~B(20). The twenty control regions B(1)~B(20) respectively have twenty warping coefficients Cw(1)~Cw(20) or twenty warping degrees of Cw(1)~Cw(20).

Figure 6D:
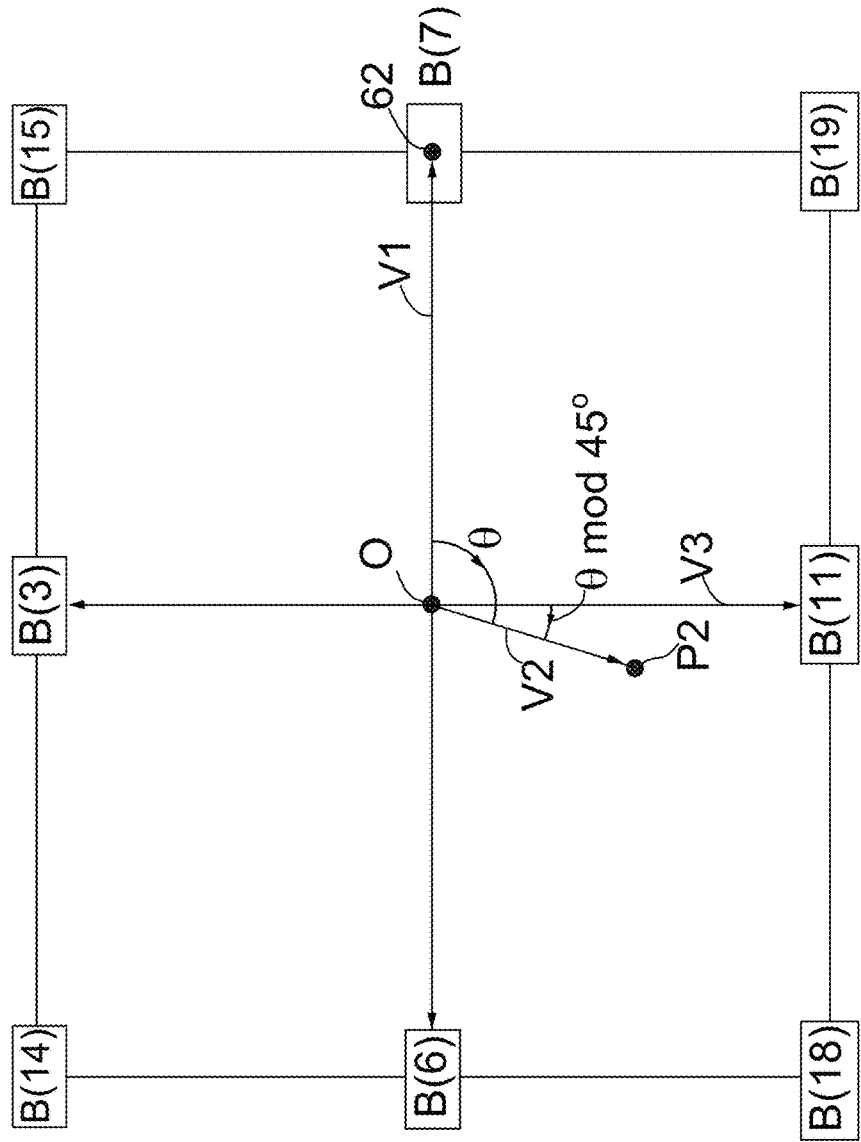
FIG. 6D is an example showing a relation between a target vertex P2 and eight control regions in a front-face lens image.

Take a target vertex P2 (with its original texture coordinates (u2, v2)) in FIG. 6D for example. Assuming that the rotation of the angle θ is clockwise and θ=93°, because there are eight control regions in the front-face lens image, then 360°/8=45°, idx=θ/45°=2(round off) and θ mod 45°=θ−idx*45°=3°. Thus, its two immediately-adjacent control regions are B(11) and B(18) and the interpolated warping coefficient/degree C.' for the target vertex P2 in the front-face lens image is defined/calculated by the following equation: C'=Cw(18)*(3/45)+Cw(11)*(1−3/45). Here, the angle θ is formed between a first vector V1 starting from the image center O to the location 62 of a starting control region B(7) and a second vector V2 starting from the image center O to the target vertex P2. Examples of the location 62 of each control region include, without limitation, a gravity center of the control region, a region center of the control region, and a median point of the control region.

To simplify the above calculation, in offline phase, the correspondence generator 250 additionally pre-determines which two control regions (B(18) and B(11)) are immediately adjacent to the target vertex P2 and writes their indices (18 and 11) to the "warping coefficient indices" field of the data structure (in Table 2) of the target vertex P2 in the modified vertex list, besides, the correspondence generator 250 additionally pre-calculates a blending weight (=3/45) for warping coefficients (Cw(18) and Cw(11)) and writes it to the "Alpha" field in the front-face lens image of the data structure (in Table 2) of the target vertex P2 in the modified vertex list. Please also note that the twenty warping coefficients (Cw(1) to Cw(20)) are stored and arranged as a 1-D warping coefficient array Cw or a 1-D data stream.

Figure 7:
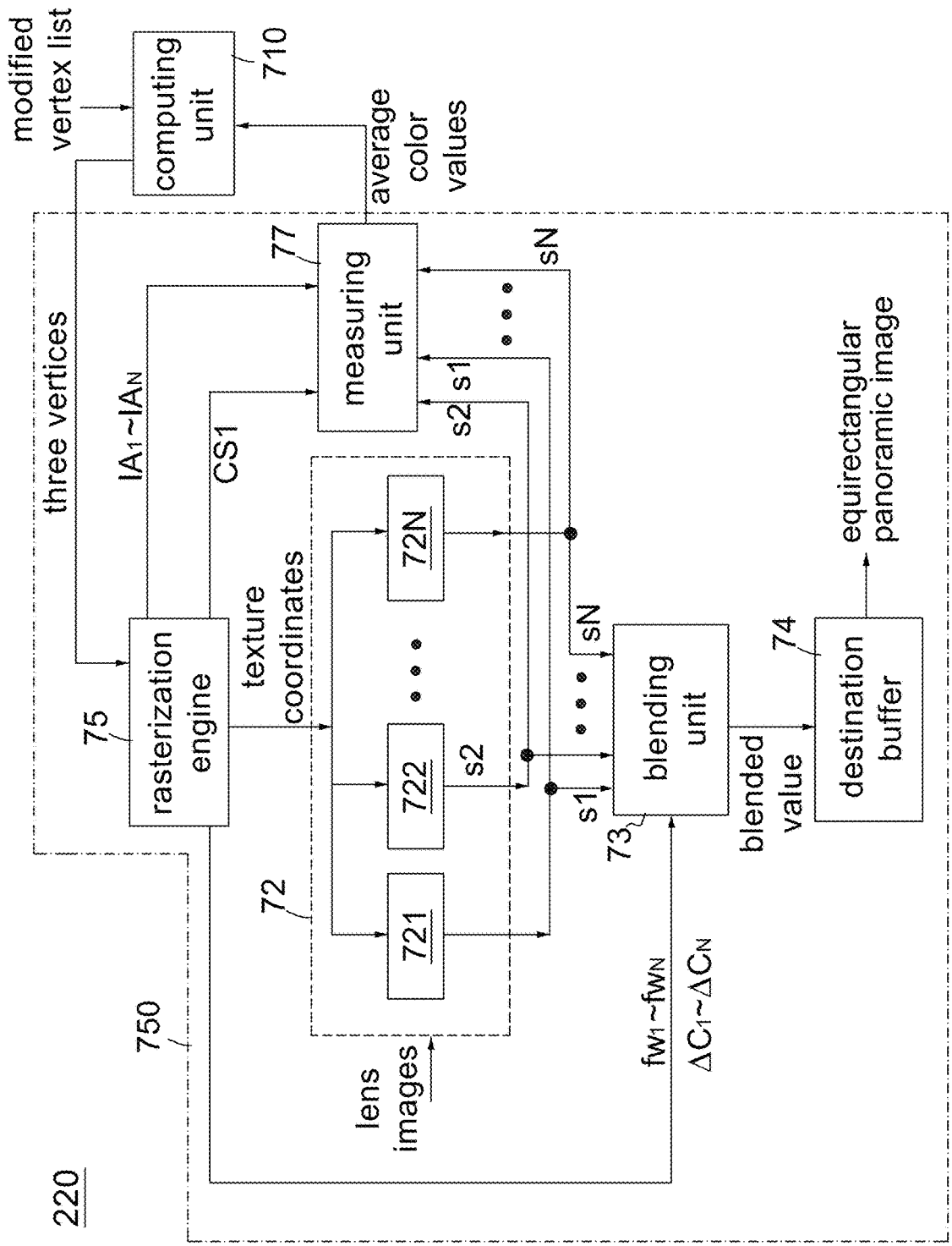
FIG. 7 is a diagram showing an image processing apparatus according to an embodiment of the invention.

Referring to FIG. 7, the image processing apparatus 220 includes a computing unit 710 and a render engine 750. The render engine 750 includes a rasterization engine 75, a texture mapping circuit 72, a blending unit 73 and a destination buffer 74. The term "rasterization" refers to a process of computing the mapping from scene geometry (or a panoramic image) to texture coordinates of each lens image. After receiving the modified vertex list, the computing unit 710 simply retrieves two warping coefficients (Cw(18) and Cw(11)) from the 1-D warping coefficient array Cw based on the "warping coefficient indices" field (i.e., 18 and 11) in the front-face lens image of the data structure of the target vertex P2 and calculates the interpolated warping coefficient/degree C.' based on the "Alpha" field (i.e., 3/45) in the front-face lens image of the data structure of the target vertex P2 (see Table 2). Then, the computing unit 710 calculates the modified texture coordinates (u2', v2') in the front-face lens image for the target vertex P2 (with its original texture coordinates (u2, v2)) according to the following equations: $u2'=(u2-u_{center})*C'+u_{center}$; $v2'=(v2-v_{center})*C'+v_{center}$, where the image center O in the front-face lens image has texture coordinates ($u_{center}$, $v_{center}$). Finally, the computing unit 710 updates the modified texture coordinates (u2', v2') in the data structure for the target vertex P2. In this manner, the computing unit 710 sequentially modifies all the texture coordinates in the data structures of all vertices from the modified vertex list according to the 1-D warping coefficient array Cw to send three vertices with their modified texture coordinates at a time to the render engine 750. The mismatch image defects (caused by shifted lens centers of the image capture module 210) are greatly improved after all the texture coordinates for all vertices are modified and the stitching process is completed. The process of determining the warping coefficients (Cw(1) to Cw(20)) for the twenty control regions B(1)~B(20)) in the 1-D warping coefficient array Cw and the detailed stitching process of the image processing apparatus 220 are disclosed in U.S. Pat. No. 10,810,700 B2 (the disclosure of which is incorporated herein by reference in its entirety).

Figure 1A:
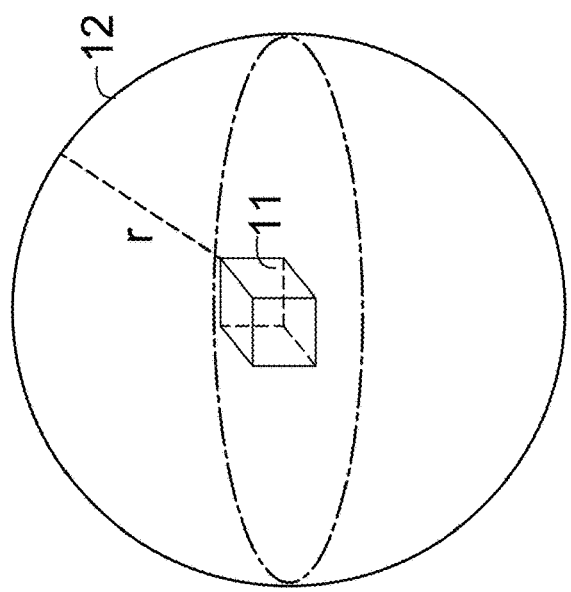
FIG. 1A shows a relation between a cube framework and a sphere.

In one embodiment of the present invention, the correspondence generator 250 in advance divides each overlapping region 13 in each lens image in FIG. 1B into three character regions, each of which can be identified by equirectangular coordinates. According to three vertices with their modified texture coordinates from the computing unit 710, the render engine 750 performs triangle rasterization, texture mapping and blending operations and causes the measuring unit 77 to calculate an average color value of each character region. Specifically, a rasterization engine 75 receives the three vertices with their modified texture coordinates and checks N number of covering/overlapping lens images in their data structures. Since the image capture module 210 is a four-lens camera, N⇐2. If N=1, the rasterization engine 75 de-asserts the control signal CS1 to disable the measuring unit 77, otherwise, asserts the control signal CS1 to enable the measuring unit 77. The rasterization engine 75 computes N texture coordinates and N face blending weights ($fw_1$~$fw_N$) in N lens images for a point/pixel Q having equirectangular coordinates (x, y) within the triangle formed by the three vertices (A, B, C). Take N=2 for example. The rasterization engine 75 computes three spatial weighting values (a, b, c) according to equirectangular coordinates ($x_A$, $y_A$, $x_B$, $y_B$, $x_C$, $y_C$, $x_Q$, $y_Q$) of pixel Q and the three vertices (A, B, C) by using a barycentric weighting method. The rasterization engine 75 computes two texture coordinates (($u_{1Q}$, $v_{1Q}$), ($u_{2Q}$, $v_{2Q}$)) of point/pixel Q according to the three spatial weighting values and texture coordinates of the three vertices (A, B, C) as follows: ($u_{1Q}$, $v_{1Q}$)=($a*u_{1A}+b*u_{1B}+c*u_{1C}$, $a*v_{1A}+b*v_{1B}+c*v_{1C}$); ($u_{2Q}$, $v_{2Q}$)=($a*u_{2A}+b*u_{2B}+c*u_{2C}$, $a*v_{2A}+b*v_{2B}+c*v_{2C}$), where $(u_{1Q}, v_{1Q})$, $(u_{1A}, v_{1A})$ $(u_{1B}, v_{1B})$ and $(u_{1C}, v_{1C})$ denote texture coordinates of point/pixel Q and the three vertices (A, B, C) in a first lens image, and $(u_{2Q}, v_{2Q})$, $(u_{2A}, v_{2A})$ $(u_{2B}, v_{2B})$ and $(u_{2C}, v_{2C})$ denote texture coordinates of point/pixel Q and the three vertices (A, B, C) in a second lens image. According to the two texture coordinates, two texture mapping engines 721~722 of the texture mapping circuit 72 texture map the texture data from the two lens images using any appropriate method (such as nearest-neighbour interpolation, bilinear interpolation or trilinear interpolation) to generate two sample values (s1~s2) for the point/pixel Q in parallel. Here, the sample value (s1~s2) may be a luma value or a chroma value. Then, the rasterization engine 75 sends two indices $(IA_1 \sim IA_2)$ of color value accumulators for first/second lens images to the measuring unit 77 according to the data structure of each of the three vertices from the computing unit 710.

For the above point/pixel Q, the measuring unit 77 accumulates its sample value s1 by using a color value accumulator $(IA_1)$ (not shown) and counts the number of pixels (accumulated by the color value accumulator $(IA_1)$) by a pixel counter $(IA_1)$ (not shown); the measuring unit 77 accumulates its sample value s2 by using a color value accumulator $(IA_2)$ (not shown) and counts the number of pixels (accumulated by the color value accumulator $(IA_2)$) by a pixel counter $(IA_2)$ (not shown). In this manner, the measuring unit 77 accumulates the sample values and the numbers of the pixels for all the points/pixels in each of the twenty-four character regions $Z_i^{(j)}$. Since the image capture module 210 includes four lenses (right, left, front, back) and only six out of the eight character regions for each lens image need to calculate the average color values, there are a total of twenty-four character regions (that need to calculate the average color values), twenty-four color value accumulators and twenty-four pixel counters. Finally, after all the vertices associated with the modified vertex list are sent to the rasterization engine 75, the measuring unit 77 calculates an average color value $AC_i^{(j)}$ (including Y, U and V components) of each character region $Z_i^{(j)}$ according to the outputs of a corresponding pixel counter and a corresponding color value accumulator.

Based on equirectangular coordinates of the vertices, it is easy to identify whether a vertex belongs to one of character regions. There are three ways to determine the texture coordinates of each character point of each character region. (1) vertex-level before modification: the computing unit 710 accumulates the number and the original texture coordinates of the vertices from the modified vertex list for each character region to calculate the average of the original texture coordinates as the texture coordinates of each character point of each character region. (2) vertex-level after modification: the computing unit 710 accumulates the number and the modified texture coordinates of the vertices related to the modified vertex list for each character region to calculate the average of the modified texture coordinates as the texture coordinates of each character point of each character region. (3) pixel-level after modification: the measuring unit 77 receives the texture coordinates of all pixels (not shown) and accumulates the number and the texture coordinates of pixels for each character region to calculate the average of the texture coordinates of the pixels as the texture coordinates of each character point of each character region.

Figure 8A:
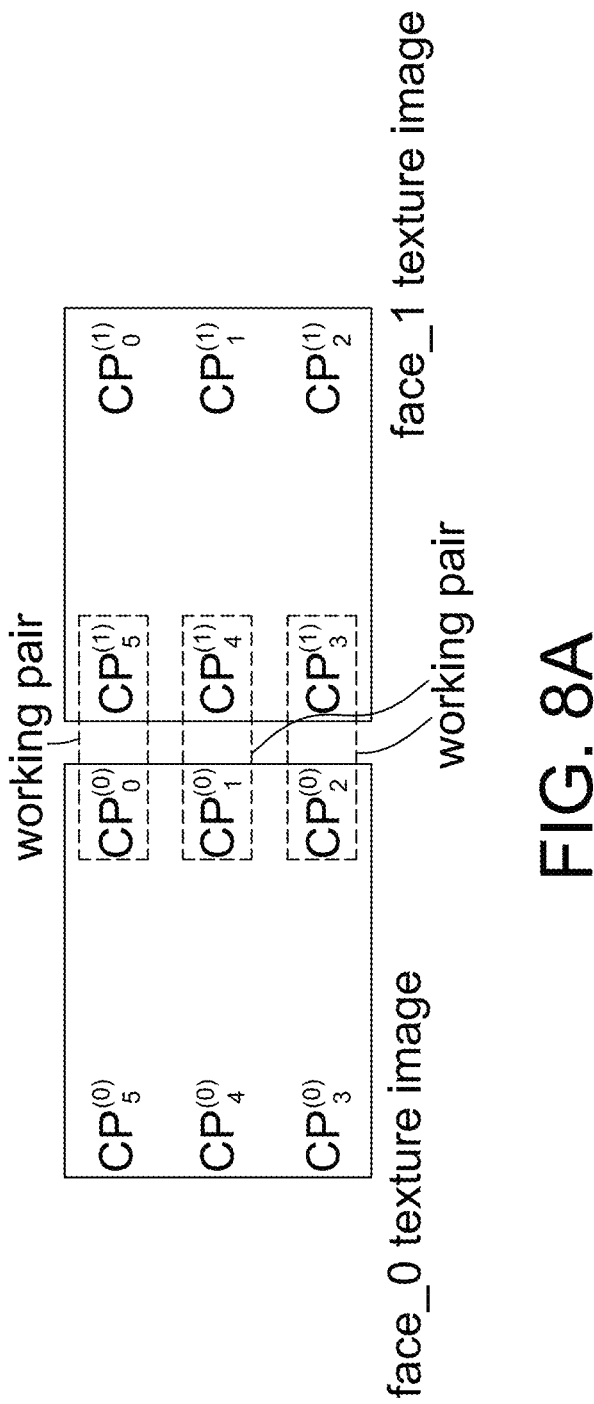
FIG. 8A show an example of three working pairs between face_0 and face_1 texture images.

A feature of the invention is to treat two character points of two character regions in two neighboring texture images as a working pair and to respectively determine the color adjustment amounts of the two character points in the working pair according to the color difference (including lightness difference and chromatic difference) between the two character points. For example, in FIG. 8A, two character points (e.g., $CP_1^{(0)}$ & $CP_4^{(1)}$) of two character regions (e.g., $Z_1^{(0)}$ & $Z_4^{(1)}$) in two neighboring texture images face_0 and face_1 are regarded as a working pair.

Figure 8B:
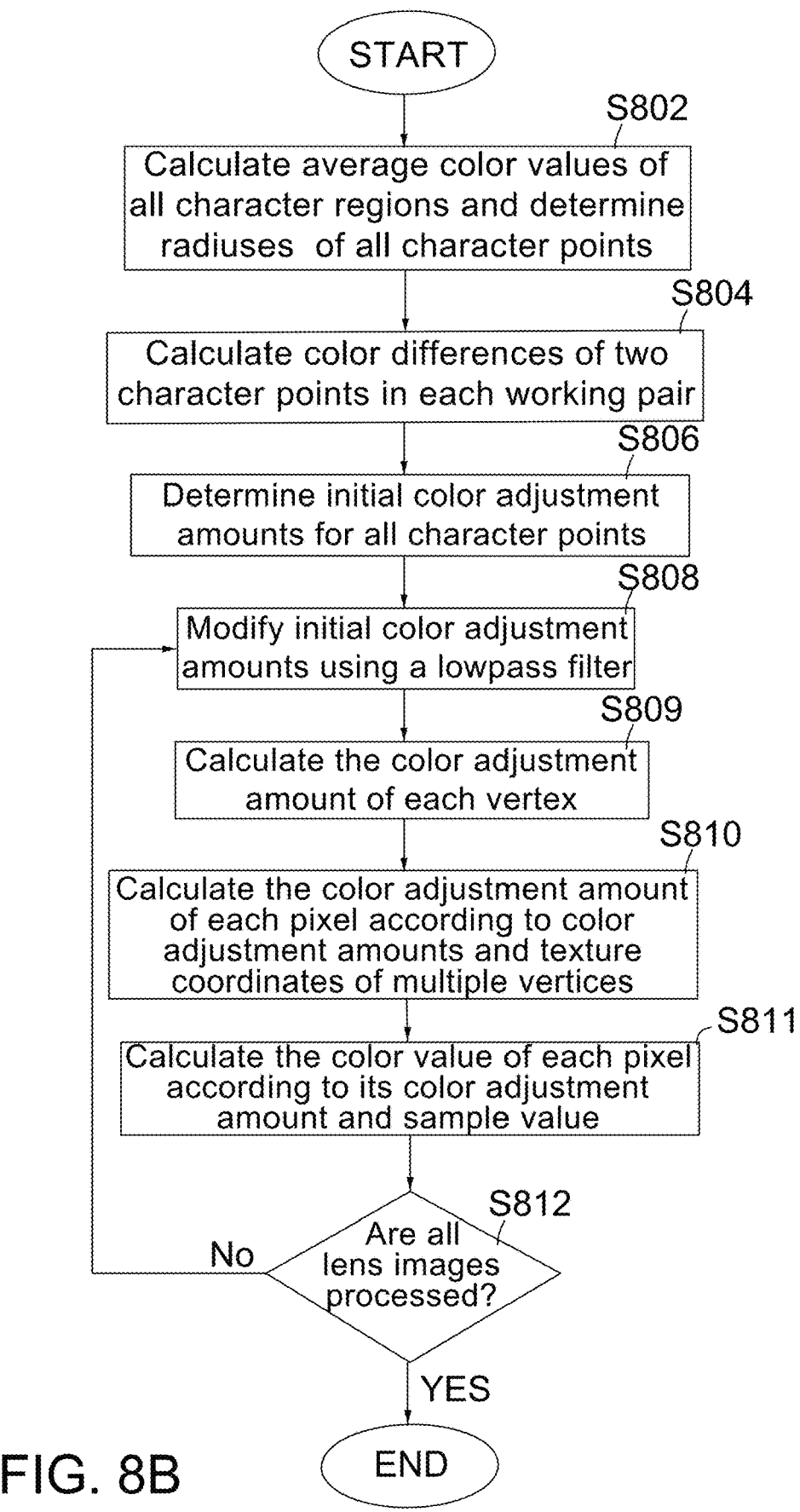
FIG. 8B is a flow chart showing a method of compensating for color differences between adjacent lens images in a panoramic image according to a first embodiment of the invention.

FIG. 8B is a flow chart showing a method of compensating for color differences between adjacent lens images in a panoramic image (performed by the image processing apparatus 220) according to a first embodiment of the invention. The method of compensating for color differences between adjacent lens images in a panoramic image is described below.

Step S802: Calculate the average color values $AC_i^{(j)}$ for each character region $Z_i^{(j)}$ and determine texture coordinates (or radiuses relative to its image center) of character points $CP_i^{(j)}$ for all character regions $Z_i^{(j)}$, for i=0~5 and j=0~3. Please refer to the methods described in FIGS. 3A and 5A and the descriptions in connection with FIG. 7.

Step S804: Calculate color differences (including Y, U and V components) for two character points in each working pair. For example, regarding the working pair ($CP_1^{(0)}$ & $CP_4^{(1)}$), calculate a color difference: $D_1^{(0)}=AC_0^{(0)}-AC_4^{(1)}$, for character point $CP_1^{(0)}$ and a color difference: $D_4^{(1)}=AC_4^{(1)}-AC_0^{(0)}$, for character point $CP_4^{(1)}$.

Step S806: Determine initial color adjustment amounts $Adj_i^{(j)}$ for all character points $CP_i^{(j)}$, for i=0~7 and j=0~3. For example, the initial color adjustment amounts for the two character points $CP_1^{(0)}$ & $CP_4^{(1)}$ are set to $(-D_1^{(0)}/2)$ and $(D_4^{(1)}/2)$, respectively. The initial color adjustment amounts of one working pair are usually corresponding to its color difference, such as its color difference divided by an integer. Also, a sum of the initial color adjustment amounts for the two character points of one working pair are usually less than absolute value of their color differences. Please note that the above values for the initial color adjustment amounts are provided as an example but not limitations of the invention. In actual implementations, other values are applicable to the initial color adjustment amounts. Please note that the initial color adjustment amounts for the two character points $CP_6^{(j)}$ & $CP_7^{(j)}$ (not forming any working pair with any character points in adjacent texture images) are set to 0.

Step S808: Modify the initial color adjustment amounts $Adj_i^{(j)}$ using a lowpass filter to obtain the final color adjustment amounts $Adj'_i^{(j)}$ of all the character regions in the texture image j, for i=0~7 and j=0~3. For example, as shown in FIG. 8C, eight initial color adjustment amounts (including Y, U and V components) of eight character regions on the left side are filtered with a lowpass filter on the right side to obtain eight final color adjustment amounts (including Y, U and V components) at the bottom. Please note that the sequences of steps S806 and S808 are exchangeable.

Figure 8D:
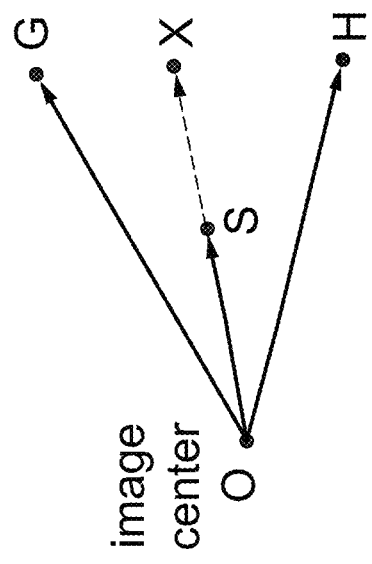
FIG. 8D is an example showing a position relation among the image center O, a target pixel/vertex S and two neighboring character points (G and H) in a front-face lens image.

Step S809: Calculate the color adjustment amount (including Y, U and V components) of each vertex in a texture image j according to distances/radiuses of the vertex and its two neighboring character points and the final color adjustment amounts of the two neighboring character points. FIG. 8D is an example showing a position relation among the image center O, a target vertex S and two neighboring character points (G and H) in a front-face lens image. Referring to FIG. 8D, there are a first included angle ∠GOS between a first side $\overline{OG}$ and a second side $\overline{OS}$ and a second included angle ∠HOS between a third side $\overline{OG}$ and the second side $\overline{OS}$, where X is an interpolated point and the two vectors $\overrightarrow{OX}$ and $\overrightarrow{OS}$ have the same directions. Assuming that the character point G has a distance/radius RG relative to the image center O of the front-face lens image (e.g., the texture image j) and a final color adjustment amount $\text{Adj'}_G^{(j)}$, the character point H has a distance/radius RH relative to the image center O and a final color adjustment amount $\text{Adj'}_H^{(j)}$ and a blending weight $\alpha = \angle GOS/\angle HOS$, then the color adjustment amount $\text{Adj}_X^{(j)}$ and the radius RX relative to the image center O for the interpolated point X are calculated according to equations (1) and (2): $\text{Adj}_X^{(j)} = (1-\alpha)*\text{Adj'}_G^{(j)} + \alpha*\text{Adj'}_H^{(j)}$ ... (1); $RX = (1-\alpha)*RG + \alpha*RH$ ... (2). Finally, the color adjustment amount $\text{Adj}_S^{(j)}$ (including Y, U and V components) for the target vertex S is calculated according to the equation (3): $\text{Adj}_S^{(j)} = \|\overrightarrow{OS}\| \times \text{Adj}_X^{(j)}/RX$ ... (3), where $\|\overrightarrow{OS}\|$ denotes the distance/radius between the image center O and the target vertex S. In this manner, the color adjustment amounts of all vertices in the texture image j are obtained, for j=0~3.

Step S810: Calculate the color adjustment amount (including Y, U and V components) of each pixel within polygons (e.g., triangles/quadrilaterals in FIG. 4B) formed by multiple vertices (e.g., three/four vertices) for each lens image according to the final color adjustment amounts and texture coordinates of the multiple vertices and texture coordinates of each vertex. For example, if a target pixel S0 located in a triangle formed by three vertices having final color adjustment amounts and texture coordinates, use a color adjustment plane equation (e.g., $f(u,v)=p*u+q*v+r$) based on the texture coordinates of a target pixel S0 and the three vertices to obtain the color adjustment amount for the target pixel S0. For example, the parameter values (p, q, r) in a color adjustment plane equation: $f(u, v)=p*u+q*v+r$, for the lens image are determined according to the three final color adjustment amounts and the texture coordinates of the three vertices, and then the color adjustment amount $\Delta C_{0S}$ for the target pixel S0 within a triangle defined by the three vertices in the front-face lens image are calculated according to the texture coordinates $(u_{0S}, v_{0S})$ of a target pixel S0 and the color adjustment plane equation: $\Delta C_{0S}=p*u_{0S}+q*v_{0S}+r$. If a target pixel S1 is located within a quadrilateral formed by four vertices having final color adjustments and texture coordinates, use bilinear interpolation based on the texture coordinates $(u_{1S}, v_{1S})$ of the target pixel S1 to obtain the color adjustment amount for the target pixel S1. In this manner, the color adjustment amount of each pixel in the texture image is obtained. The color adjustment amounts for all pixels for the lens image j are stored in an individual 2D color adjustment array.

Step S811: Calculate the color value (including Y, U and V components) of each pixel in a texture image j based on its corresponding sample value (including Y, U and V components) and color adjustment amount (including Y, U and V components) in its corresponding 2D color adjustment array. At the end of this step, a color-compensated lens image for the lens image j is formed.

Step S812: Determine whether all faces of texture/lens images are all processed. If NO, go to step S808 for the following texture image, otherwise, the flow is terminated and then four color-compensated lens images are formed.

Figure 8E:
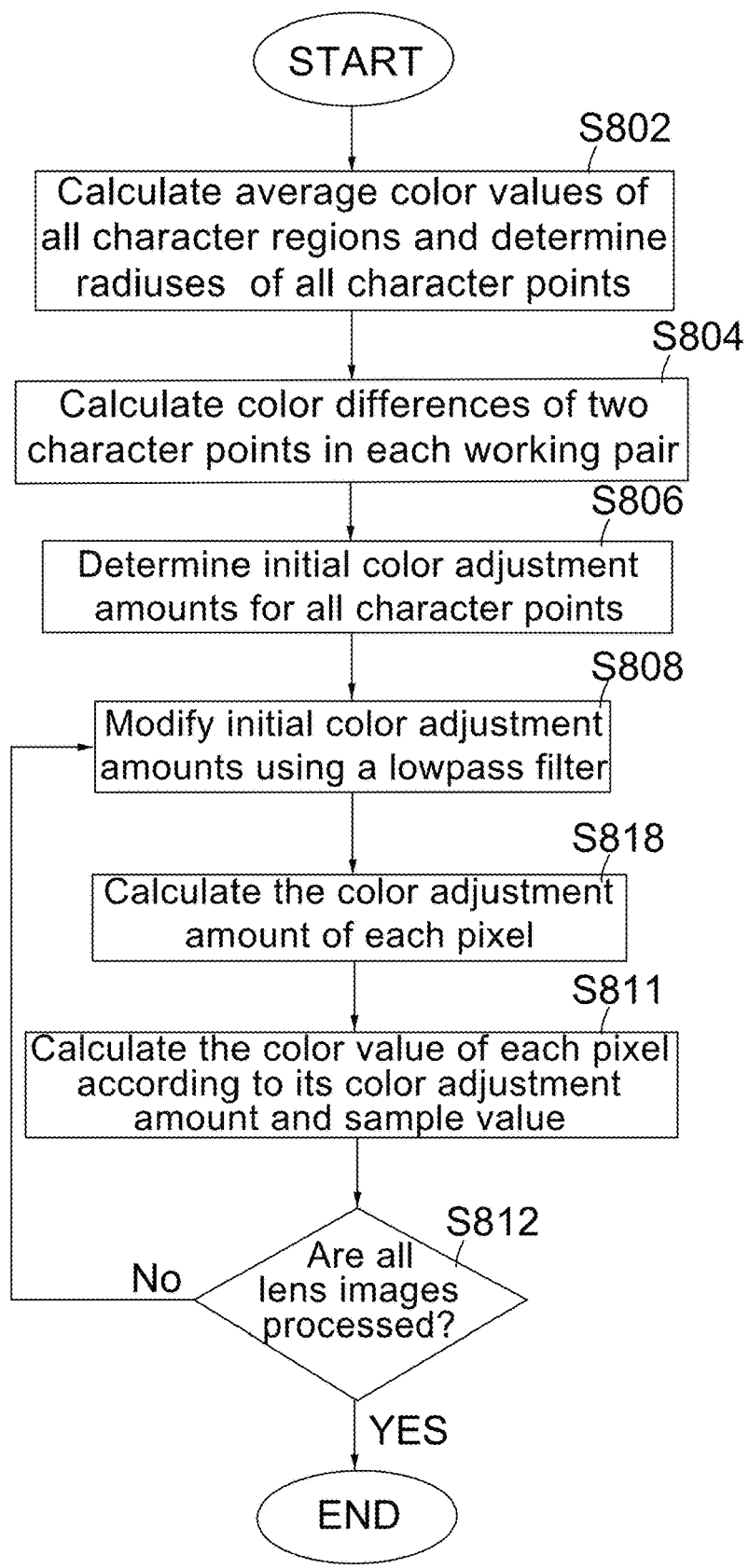
FIG. 8E shows a flow chart of a method of compensating for color differences between adjacent lens images in a panoramic image according to a second embodiment of the invention.

FIG. 8E show a flow chart of a method of compensating for color differences between adjacent lens images in a panoramic image (performed by the image processing apparatus 220) according to a second embodiment of the invention. In the method of FIG. 8E, steps S802~S808 and S811~S812 are the same as those in FIG. 8B and thus their descriptions are omitted herein.

Step S818: Calculate the color adjustment amount (including Y, U and V components) of each pixel in a texture image according to distances/radiuses (relative to its image center) of the pixel and its two neighboring character points and the final color adjustment amounts of the two neighboring character points. Referring again to FIG. 8D, in this embodiment, please regard the target point S as a pixel. Similar to the calculations described in step S809, the color adjustment amount $\text{Adj}_S^{(j)}$ (including Y, U and V components) for the target pixel S in the lens image j is calculated according to equations (1)~(3). In the same manner, the color adjustment amounts of all pixels in the lens image j can are obtained, for j=0~3.

Please note that the compensation methods of FIGS. 8B and 8E can be regarded as pre-processing operations before the image processing apparatus 220 performs the normal rasterization, texture-mapping and blending operations according to the four color-compensated lens images (i.e, the output of step S812).

Figure 9A:
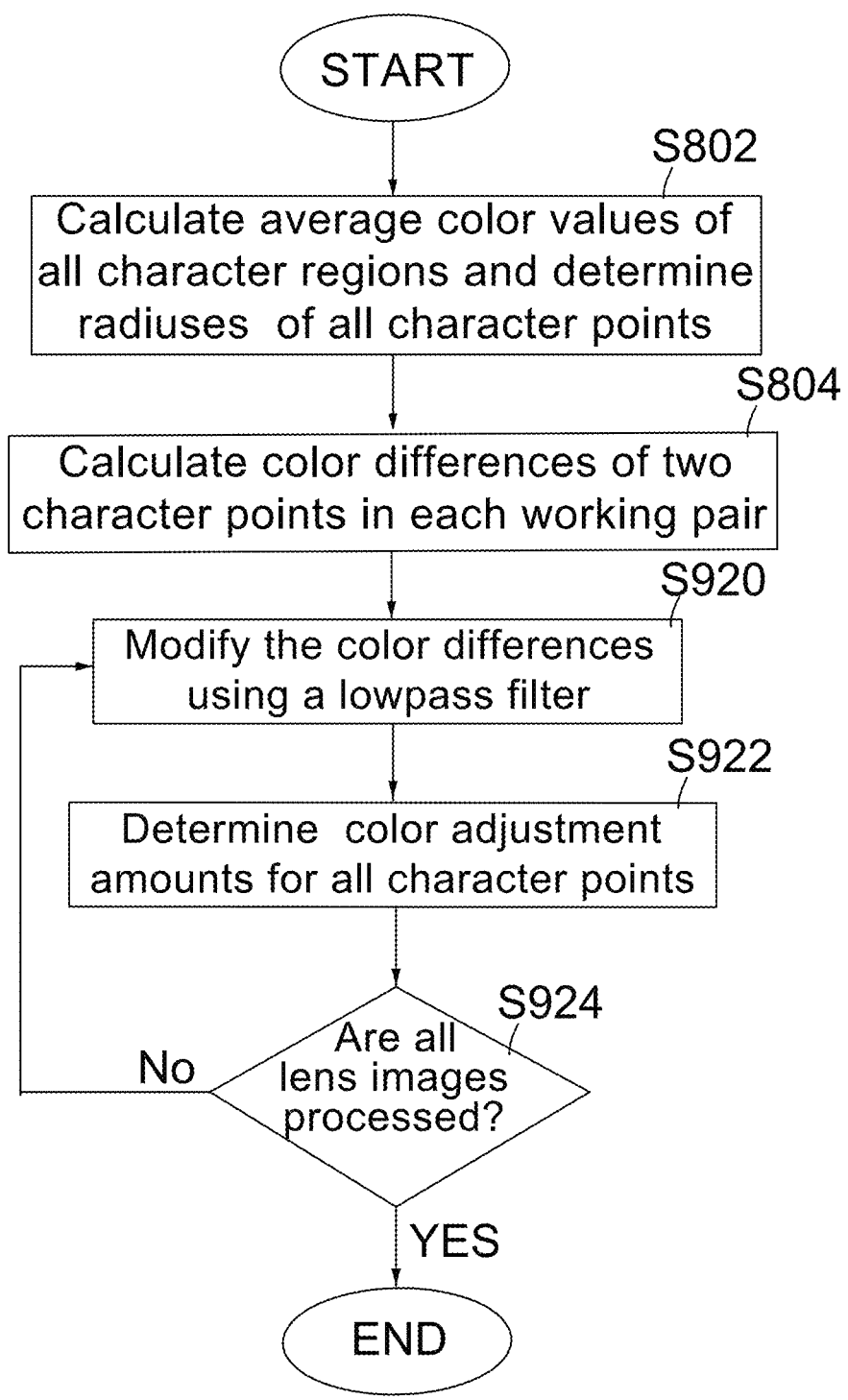
FIG. 9A shows a flow chart of a method of acquiring color adjustment amounts and radiuses of multiple character points for all lens images in a panoramic image according to an embodiment of the invention.

FIG. 9A shows a flow chart of a method of acquiring color adjustment amounts and radiuses of multiple character points for all lens images in a panoramic image (performed by the image processing apparatus 220) according to an embodiment of the invention. In the method of FIG. 9A, steps S802 and S804 are the same as those in FIG. 8B and thus their descriptions are omitted herein.

Step S920 Modify the color differences (i.e., $D_0^{(j)} \sim D_7^{(j)}$) of character points $CP_0^{(j)} \sim CP_7^{(j)}$ in one lens image j using a lowpass filter to obtain the filtered color differences (including Y, U and V components) of character points $CP_0^{(j)} \sim CP_7^{(j)}$. The color differences for the two character points $CP_6^{(j)}$ & $CP_7^{(j)}$ (not forming any working pair with any character points in adjacent texture images) are set to 0, for j=0~3.

Step S922: Determine color adjustment amounts (including Y, U and V components) of character points $CP_0^{(j)} \sim CP_7^{(j)}$ in one lens image j according to the filtered color differences of the character points $CP_0^{(j)} \sim CP_7^{(j)}$. Please note that the sequences of steps S920 and S922 are interchangeable.

Step S924: Check whether all faces of texture/lens images are all processed. If NO, go to step S920 for the following texture image; otherwise, the flow is terminated. At the end of this step, the thirty-two color adjustment amounts $\text{Adj'}_i^{(j)}$ and thirty-two distances/radiuses (relative to its image center) of the thirty-two character points $CP_i^{(j)}$ are respectively stored and arranged as a 1-D color adjustment amount array CA[m] and a 1-D radius array RA[m], where m=0~31, j=0~3 and i=0~7. The purpose of the method of FIG. 9A is to acquire/set up the 1-D color adjustment amount array CA[m] and the 1-D radius array RA[m] for the method of FIGS. 9B and 9C.

In offline phase, the correspondence generator 250 additionally pre-determines which two character points (e.g., G and H relative to the target vertex S in FIG. 8D) are immediately adjacent to a target vertex and writes their index values ($\text{ide}_{k0}$ and $\text{ide}_{k1}$; for example, $CA[\text{ide}_{k0}]=RH$ and $CA[\text{ide}_{k1}]=RG$) to the "color adjustment indices" field for the lens image j in the data structure of the target vertex in the modified vertex list in Table 2; besides, the correspondence generator 250 additionally pre-calculates a blending weight for color adjustment (e.g., $cw_k = \angle GOS/\angle HOS = \alpha$ in FIG. 8D) and writes it to the "blending weight for color adjustment" field for the lens image j in the data structure of the target vertex in the modified vertex list. In the same manner, the "color adjustment indices" field and "blending weight for color adjustment" field for each lens image in the data structures of all the vertices in the modified vertex list in Table 2 are calculated by the correspondence generator 250 in offline phase.

Figure 9B:
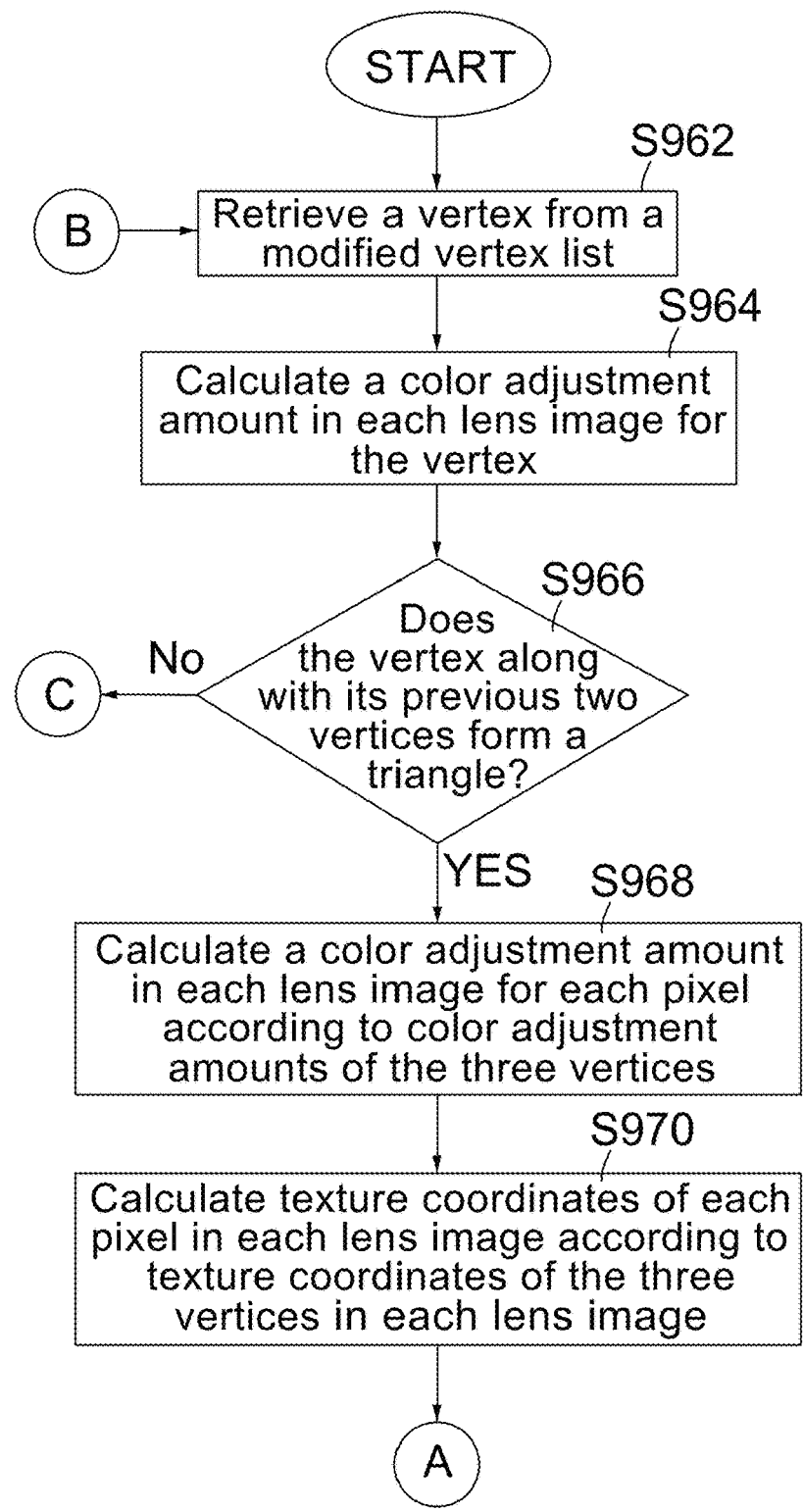
FIGS. 9B-9C show a flow chart of a method of compensating for color differences between adjacent lens images in a panoramic image according to a third embodiment of the invention.
Figure 9C:
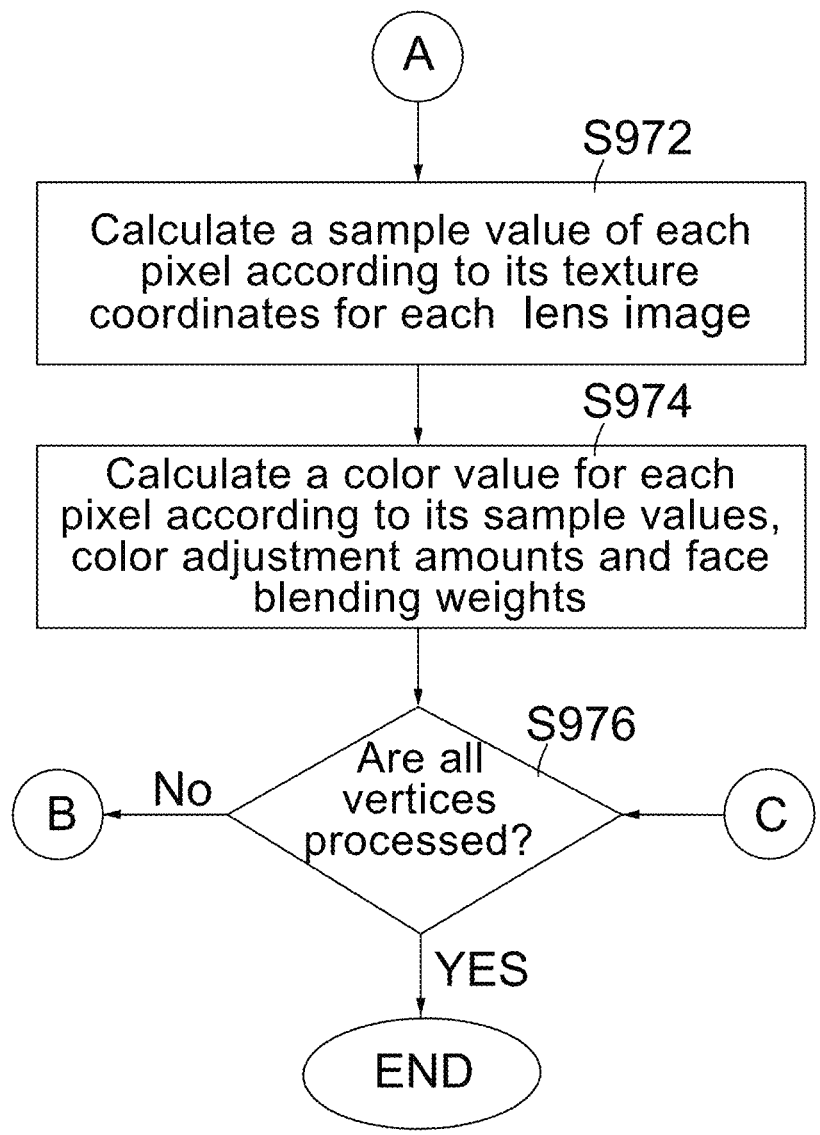

FIGS. 9B-9C show a flow chart of a method of compensating for color differences between adjacent lens images in a panoramic image (performed by the image processing apparatus 220) according to a third embodiment of the invention. The purpose of the method of FIGS. 9B-9C is to apply the 1-D color adjustment amount array CA[m] and the 1-D radius array RA[m] to the input lens images so as to form a color-compensated panoramic image. Referring to FIGS. 7 and 9B-9C, the method of compensating for color differences between adjacent lens images in a panoramic image is described below.

Step S962: Retrieve a vertex from a modified vertex list (Table 2).

Step S964: Calculate a color adjustment amount in each lens image for the vertex according to its texture coordinates, values from both the "blending weight for color adjustment" field and the "color adjustment indices" field of the data structure. Assuming a vertex C from the modified vertex list is overlapped with two-face lens images (front-face, top-face; N=2), and the vertex C has the following data structure with their texture coordinates already modified by the computing unit 710: vertex C:$\{(x_C, y_C), 2, 0, ID_{Front}, (u_{1C}, v_{1C}), w_{1C}, (idx_{10C}, idx_{11C}), Alpha_{1C}, IA_{1C}, (ide_{10C}, ide_{11C}), cw_{1C}, ID_{Top}, (u_{2C}, v_{2C}), w_{2C}, (idx_{20C}, idx_{21C}), Alpha_{2C}, IA_{2C}, (ide_{20C}, ide_{21C}), cw_{2C}\}$. The rasterization engine 75 calculates a distance ($d_{1C}$) of vertex C relative to image center O with texture coordinates ($u_O, v_O$) in front-face lens image according to the following equation: $d_{1C}=sqrt((u_{1C}-u_O)*(u_{1C}-u_O)+(v_{1C}-v_O)*(v_{1C}-v_O))$. Then, the rasterization engine 75 retrieves a weight ($cw_{1C}$) from the "blending weight for color adjustment" field in the front-face lens image of the data structure of the vertex C, and retrieves a pair of index values ($ide_{10C}, ide_{11C}$) from the "color adjustment indices" field in front-face lens image of the data structure of the vertex C. Next, the rasterization engine 75 calculates a radius $R_{1XC}$ of an interpolated vertex Xc in the front-face lens image according to the following equation: $R_{1XC}=cw_{1C}*RA[ide_{10C}]+(1-cw_{1C})*RA[ide_{11C}]$. Next, the rasterization engine 75 calculates the color adjustment amount $\Delta C_{1C}$ of the vertex C in the front-face lens image according to the following equation: $\Delta C_{1C}=(cw_{1C}*CA[ide_{10C}]+(1-cw_{1C})*CA[ide_{11C}])*(d_{1C}/R_{1XC})$. Likewise, the rasterization engine 75 calculates the color adjustment amount $\Delta C_{2C}$ of the vertex C in the top-face lens image according to the following equation: $\Delta C_{2C}=(cw_{2C}*CA[ide_{20C}]+(1-cw_{2C})*CA[ide_{21C}])*(d_{2C}/R_{2XC})$.

Step S966: Check whether the vertex along with its immediately-previous two vertices form a triangle. If NO, go to step S976; otherwise, go to step S968.

Step S968: Calculate a color adjustment amount in each lens image for each pixel within the triangle according to color adjustment amounts of the three vertices and the texture coordinates of the pixel.

Assuming the vertex C and its immediately-previous two vertices (A, B) from the modified vertex list are overlapped with two-face lens images (front-face, top-face; N=2), and the two vertices (A, B) have the following data structures with their texture coordinates already modified by the computing unit 710: vertex A:$\{(x_A, y_A), 2, 0, ID_{Front}, (u_{1A}, v_{1A}), w_{1A}, (idx_{10A}, idx_{11A}), Alpha_{1A}, IA_{1A}, (ide_{10A}, ide_{11A}), cw_{1A}, ID_{Top}, (u_{2A}, v_{2A}), w_{2A}, (idx_{20A}, idx_{21A}), Alpha_{2A}, IA_{2A}, (ide_{20A}, ide_{21A}), cw_{2A}\}$; vertex B:$\{(x_B, y_B), 2, 0, ID_{Front}, (u_{1B}, v_{1B}), w_{1B}, (idx_{10B}, idx_{11B}), Alpha_{1B}, IA_{1B}, (ide_{10B}, ide_{11B}), cw_{1B}, ID_{Top}, (u_{2B}, v_{2B}), w_{2B}, (idx_{20B}, idx_{21B}), Alpha_{2B}, IA_{2B}, (ide_{20B}, ide_{21B}), cw_{2B}\}$. Similar to the calculation described in step S964, the rasterization engine 75 calculates the color adjustment amounts ($\Delta C_{1A}, \Delta C_{1B}$) of the two vertices (A, B) in the front-face lens image according the following equations: $\Delta C_{1A}=(cw_{1A}*CA[ide_{10A}]+(1-cw_{1A})*CA[ide_{11A}])*(d_{1A}/R_{1XA})$; $\Delta C_{1B}=(cw_{1B}*CA[ide_{10B}]+(1-cw_{1B})*CA[ide_{11B}])*(d_{1B}/R_{1XB})$. Besides, the rasterization engine 75 calculates the color adjustment amounts ($\Delta C_{2A}, \Delta C_{2B}$) of the three vertices (A, B) in the top-face lens image according the following equations: $\Delta C_{2A}=(cw_{2A}*CA[ide_{20A}]+(1-cw_{2A})*CA[ide_{21A}])*(d_{2A}/R_{2XA})$; $\Delta C_{2B}=(cw_{2B}*CA[ide_{20B}]+(1-cw_{2B})*CA[ide_{21B}])*(d_{2B}/R_{2XB})$.

Next, the rasterization engine 75 determines the parameter values (p, q, r) in a color adjustment plane equation $f(u, v)=p*u+q*v+r$ for the front-face lens image according to the above color adjustment amounts ($\Delta C_{1A}, \Delta C_{1B}$ and $\Delta C_{1C}$) and texture coordinates of the three vertices. The rasterization engine 75 then calculates the color adjustment amount $\Delta C_{1T}$ for a target pixel $T(u_{1T}, v_{1T})$ within a triangle defined by the three vertices A, B, C in the front-face lens image according to a color adjustment plane equation: $\Delta C_{1T}=p*u_{1T}+q*v_{1T}+r$. Likewise, the rasterization engine 75 calculates the color adjustment amount $\Delta C_{2T}$ for the target pixel $T(u_{2T}, v_{2T})$ within the triangle defined by the three vertices A, B, C in the top-face lens image. Besides, the rasterization engine 75 computes two face blending weights ($fw_1 \sim fw_2$) corresponding to the two face lens images according to the three spatial weighting values (a, b, c) and three stitching blending weights (see Table 2) of the three vertices as follows: $fw_1=a*w_{1A}+b*w_{1B}+c*w_{1C}$; $fw_2=a*w_{1A}+b*w_{1B}+c*w_{1C}$. Then, the rasterization engine 75 sends two face blending weights ($fw_1 \sim fw_2$) and two color adjustment amounts ($\Delta C_{1T}, \Delta C_{2T}$) (including Y, U and V components) corresponding to front-face and top-face lens images for the pixel T to the blending unit 73. In the same manner, the rasterization engine 75 calculates the color adjustment amount in each lens image for each pixel within the triangle.

Step S970: Calculate texture coordinates of each pixel within the triangle according to texture coordinates of the three vertices for each lens image. Take the target pixel T and the vertices A, B, C in step S968 for example. The texture coordinates ($u_{1T}, v_{1T}$) of the target pixel T in the front-face lens image is calculated as: $(u_{1T}, v_{1T})=(a*u_{1A}+b*u_{1B}+c*u_{1C}, a*v_{1A}+b*v_{1B}+c*v_{1C})$; $(u_{2T}, v_{2T})=(a*u_{2A}+b*u_{2B}+c*u_{2C}, a*v_{2A}+b*v_{2B}+c*v_{2C})$, where ($u_{1A}, v_{1A}$) ($u_{1B}, v_{1B}$) and ($u_{1C}, v_{1C}$) denote texture coordinates of the three vertices (A, B, C) in front-face lens image, ($u_{2A}, v_{2A}$), ($u_{2B}, v_{2B}$) and ($u_{2C}, v_{2C}$) denote texture coordinates of the three vertices (A, B, C) in top-face lens image and (a, b, c) denotes three spatial weighting values.

Step S972: Texture map the texture data from the lens images according to texture coordinates of each pixel within the triangle. Again, take the target pixel T and the vertices A, B, C in step S970 for example. According to the two texture coordinates ($u_{1T}, v_{1T}$) and ($u_{2T}, v_{2T}$), the two texture mapping engines 721~722 texture map the texture data from the two face lens images using any appropriate method (such as nearest-neighbour interpolation, bilinear interpolation or tri-linear interpolation) to generate two sample values s1 and s2.

Step S974: Calculate the color value (including Y, U and V components) for each pixel within the triangle according to its sample values, color adjustments and face blending weights. Again, take the target pixel T and the vertices A, B, C in step S972 for example. After receiving the two face blending weights ($fw_1$~$fw_2$) and the two color adjustment amounts ($\Delta C_{1T}$, $\Delta C_{2T}$) from the rasterization engine 75 and the two sample values s1 and s2 from the two texture mapping engines 721~722, the blending unit 73 blends the two sample values (s1~s2) together to generate the color value Vb of pixel T using the following equation: Vb=$fw_1$*(s1+$\Delta C_{1T}$)+$fw_2$*(s2+$\Delta C_{2T}$), where $fw_1$+$fw_2$=1. Finally, the blending unit 73 stores the blended value Vb of pixel T in a corresponding location in the destination buffer 74. In the same manner, the color value of each pixel within the triangle (A, B, C) are calculated.

Step S976: Check whether all the vertices are processed. If NO, go to step S962; otherwise, the flow is terminated and then a color-compensated panoramic image is formed.

As another example, assuming each of three vertices (A, B, C) from the modified vertex list is overlapped with a single lens image (front-face; N=1), the computation is similar except that only one lens image needs to be processed. After receiving the face blending weight ($fw_1$), the sample value (s1) and the color adjustment amounts ($\Delta C_{1T}$), the blending unit 73 generates the blended value Vb of pixel T using the following equation: Vb=$fw_1$*(s1+$\Delta C_{1T}$), where $fw_1$=1.

The image processing apparatus 220 and the correspondence generator 250 according to the invention may be hardware, software, or a combination of hardware and software (or firmware). An example of a pure solution would be a field programmable gate array (FPGA) design or an application specific integrated circuit (ASIC) design. In a preferred embodiment, the image processing apparatus 220 are implemented with a graphics processing unit (GPU) and a first program memory; the correspondence generator 250 are implemented with a general-purpose processor and a second program memory. The first program memory stores a first processor-executable program and the second program memory stores a second processor-executable program. When the first processor-executable program is executed by the GPU, the GPU is configured to function as: the image processing apparatus 220. When the second processor-executable program is executed by the general-purpose processor, the general-purpose processor is configured to function as: the correspondence generator 250.

In an alternative embodiment, the image processing apparatus 220 and the correspondence generator 250 are implemented with a general-purpose processor and a third program memory. The third program memory stores a third processor-executable program. When the third processor-executable program is executed by the general-purpose processor, the general-purpose processor is configured to function as: the image processing apparatus 220 and the correspondence generator 250.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method of compensating for color differences between adjacent lens images in a panoramic image, each of the lens images comprising multiple character regions, each of the character regions having a character point, the method comprising:
obtaining average color values of the character regions;
calculating color differences of each pair of character regions according to the average color values of the character regions;
determining color adjustment amounts of character points in each lens image according to the color differences of each pair of character regions; and
calculating a color adjustment amount of an element according to positions of the element and its two adjacent character points, and the color adjustment amounts of the two adjacent character points;
wherein the multiple character regions are located at a periphery of each lens image;
wherein two character regions of each pair of character region are located at any two adjacent lens images out of multiple lens images from a multiple-lens camera; and
wherein the step of obtaining the average color values comprises:
for each pixel within a triangle formed by three vertices from a first vertex list, performing triangle rasterization and texture mapping operations over modified texture coordinates of the three vertices to generate N sample values corresponding to N lens images, where N>1;
for each pixel within the triangle, respectively accumulating the N sample values by multiple color value accumulators indexed by N accumulator indices in data structures of the three vertices;
for each pixel within the triangle, respectively accumulating the numbers of pixels in the N lens images by multiple pixel counters indexed by the N accumulator indices;
repeating the steps of performing, respectively accumulating the N sample values and respectively accumulating the numbers of pixels until all vertices from the first vertex list are processed; and
calculating an average color value of each character region in each lens image according to output values of a corresponding color value accumulator and a corresponding pixel counter;
wherein the first vertex list comprises a plurality of vertices with their data structures that define a vertex mapping between the lens images and the panoramic image.

2. The method according to claim 1, wherein the multiple-lens camera captures a view with a 360-degree horizontal field of view (FOV) and up to a 180-degree vertical FOV to generate the multiple lens images.

3. The method according to claim 1, wherein each character point is a centroid of its corresponding character region.

4. The method according to claim 1, wherein the step of obtaining the average color values further comprises:
calculating the modified texture coordinates in each lens image for each of the three vertices according to its corresponding warping degree and original texture coordinates in each lens image prior to the step of performing the triangle rasterization and the texture mapping operations.

5. The method according to claim 1, further comprising:
determining texture coordinates of each character point of each character region in each lens image by respectively averaging the original texture coordinates of the vertices belonging to the character regions according to the numbers of vertices in their respective character regions.

6. The method according to claim 1, further comprising: determining texture coordinates of each character point of each character region in each lens image by respectively averaging the modified texture coordinates of the vertices belonging to the character regions according to the numbers of vertices in their respective character regions.

7. The method according to claim 1, further comprising: determining texture coordinates of each character point of each character region in each lens image by respectively averaging the texture coordinates of the pixels belonging to the character regions according to the output values of the multiple pixel counters.

8. The method according to claim 1, wherein the step of determining the color adjustment amounts comprises:
determining initial color adjustment amounts of all character points according to the color differences of each pair of character regions;
modifying the initial color adjustment amounts of the character points in a lens image using a lowpass filter to generate the color adjustment amounts of the character points; and
repeating the step of modifying until all lens images are processed to obtain the color adjustment amounts of the character points in each lens image.

9. The method according to claim 1, wherein the step of determining the color adjustment amounts comprises:
modifying the color differences of the character regions in a lens image using a lowpass filter to generate the filtered color differences of all character points;
determining the color adjustment amounts of the character points in a lens image according to the filtered color differences of character points; and
repeating the step of modifying the color differences and determining the color adjustment amounts until all lens images are processed to obtain the color adjustment amounts of the character points in each lens image.

10. The method according to claim 1, wherein the step of calculating the color adjustment amount of the element comprises:
calculating a radius RX of an interpolated point X located between the two adjacent character points G and H in the lens image j according to the following equation: $RX=(1-\alpha)*RG+\alpha*RH$;
calculating an color adjustment amount $Adj_X^{(j)}$ of the interpolated point X according to the following equation: $Adj_X^{(j)}=(1-\alpha)*Adj'_G^{(j)}+\alpha*Adj'_H^{(j)}$; and
calculating a color adjustment amount $Adj_S^{(j)}$ of the element S according to the following equation: $Adj_S^{(j)}=\|\overrightarrow{OS}\|\times Adj_X^{(j)}/RX$;
wherein $\|\overrightarrow{OS}\|$ denotes the distance between an image center O of the lens image j and the element S, wherein $\alpha=\angle GOS/\angle HOS$, and $Adj_G^{(j)}$ and $Adj_H^{(j)}$ respectively denote the color adjustment amounts of the two adjacent character points G and H in the lens image j, and wherein RG, RH and RX respectively denotes radiuses of the points G, H and X relative to the image center O, and two vectors $\overrightarrow{OX}$ and $\overrightarrow{OS}$ have the same directions.

11. A method of compensating for color differences between adjacent lens images in a panoramic image, each of the lens images comprising multiple character regions, each of the character regions having a character point, the method comprising:
calculating color differences of each pair of character regions according to average color values of the character regions;
determining color adjustment amounts of character points in each lens image according to the color differences of each pair of character regions;
calculating a color adjustment amount of an element according to positions of the element and its two adjacent character points, and the color adjustment amounts of the two adjacent character points; and
calculating a color value of a pixel according to its sample value and color adjustment amount;
wherein the multiple character regions are located at a periphery of each lens image;
wherein two character regions of each pair of character region are located at any two adjacent lens images out of multiple lens images from a multiple-lens camera; and
wherein the element comprises three vertices forming a triangle and the step of calculating the color adjustment amount of the element comprises:
(a) calculating a color adjustment amount of each of the three vertices from a second vertex list according to texture coordinates, a blending weight for color adjustment and a pair of index values in a data structure of each of the three vertices for each of N lens images, where N denotes the number of overlapping lens images for the three vertices, N>=1;
(b) determining parameter values for a color adjustment plane equation according to the three color adjustment amounts and texture coordinates of the three vertices for each of the N lens images; and
(c) calculating the color adjustment amount of the pixel within the triangle according to the color adjustment plane equation and the texture coordinates of the pixel for each of the N lens images;
wherein the color adjustment amounts and radiuses of the character points are respectively stored in the first array and the second array; and
wherein the second vertex list comprises a plurality of vertices with their data structures that define a vertex mapping between the lens images and the panoramic image, and each data structure comprises the texture coordinates, the blending weight for color adjustment, the pair of index values for the first array and the second array in each of the N lens images.

12. The method according to claim 11, further comprising:
repeating the step of calculating the color adjustment amount and calculating the color value until all the pixels of a lens image is processed to form a color-compensated lens image.

13. The method according to claim 12, wherein the element is a pixel.

14. The method according to claim 7, wherein the step of calculating the color value of the pixel comprises:
(d) calculating N texture coordinates in the N lens images for the pixel within the triangle formed by the three vertices according to the texture coordinates and spatial weight values of the three vertices;
(e) texture-mapping texture data from the N lens images according to the N texture coordinates of the pixel to generate N sample values;
(f) computing N face blending weight according to the spatial weighting values and stitching blending weights of the three vertices for the N lens images; and
(g) calculating the color value of the pixel according to the N face blending weights, the N sample values and the N color adjustment amounts in the N lens images;

wherein the spatial weight values are associated with equirectangular coordinates of the pixel and the three vertices; and wherein each data structure in the second vertex list further comprises the stitching blending weight in each of N lens images.

15. The method according to claim 14, wherein the step of calculating the color value of the pixel further comprises:
(h) repeating steps (c)-(g) until all pixels within the triangle are processed;
(i) repeating steps (a)-(h) until all vertices are processed to form a color-compensated panoramic image.

* * * * *